United States Patent
Cai et al.

(10) Patent No.: US 9,596,184 B1
(45) Date of Patent: *Mar. 14, 2017

(54) HOT SERVICE FLOW HARDWARE OFFLOADS BASED ON SERVICE PRIORITY AND RESOURCE USAGE

(71) Applicant: F5 Networks, Inc., Seattle, WA (US)

(72) Inventors: Hao Cai, Sammamish, WA (US); Michael Thomas Barthelow, Seattle, WA (US); Paul Imre Szabo, Shoreline, WA (US); Timothy Scott Michels, Greenacres, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,111

(22) Filed: Oct. 28, 2015

Related U.S. Application Data

(63) Continuation of application No. 13/772,194, filed on Feb. 20, 2013, now Pat. No. 9,203,771.

(Continued)

(51) Int. Cl.
 *H04L 12/803* (2013.01)
 *H04L 12/801* (2013.01)
 (Continued)

(52) U.S. Cl.
 CPC ............ *H04L 47/125* (2013.01); *H04L 47/10* (2013.01); *H04L 45/38* (2013.01); *H04L 47/2441* (2013.01)

(58) Field of Classification Search
 None
 See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |

(Continued)

FOREIGN PATENT DOCUMENTS

| | | |
|---|---|---|
| EP | 0 744 850 A2 | 11/1996 |
| WO | 91/14326 A2 | 9/1991 |

(Continued)

OTHER PUBLICATIONS

"A Process for Selective Routing of Servlet Content to Transcoding Modules," Research Disclosure 422124, IBM Corporation, pp. 889-890, Jun. 1999. cited by other.

(Continued)

*Primary Examiner* — Edan Orgad
*Assistant Examiner* — Saumit Shah
(74) *Attorney, Agent, or Firm* — John W. Branch; Lowe Graham Jones PLLC

(57) ABSTRACT

Embodiments are directed towards improving the performance of network traffic management devices by optimizing the management of hot connection flows. A packet traffic management device ("PTMD") employs a data flow segment ("DFS") and control segment ("CS"). The CS performs high-level control functions and per-flow policy enforcement for connection flows maintained at the DFS, while the DFS performs statistics gathering, and per-packet policy enforcement, on connection flows maintained at the DFS. The DFS may include high-speed flow caches and other high-speed components. Making efficient use of the high speed flow cache capacity may be improved by maximizing the number of hot connection flows based on unique service and network traffic characteristics through adaptive feedback pattern learning together with administrator configurable service preferences that may have flow control data for (Continued)

most bandwidth hungry and desired hot services offloaded to the high-speed flow cache, at appropriate time.

20 Claims, 14 Drawing Sheets

Related U.S. Application Data

(60) Provisional application No. 61/674,521, filed on Jul. 23, 2012.

(51) Int. Cl.
*H04L 12/721* (2013.01)
*H04L 12/851* (2013.01)

(56) References Cited

U.S. PATENT DOCUMENTS

| | | | |
|---|---|---|---|
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,246,684 B1 | 6/2001 | Chapman et al. |
| 6,253,230 B1 | 6/2001 | Couland et al. |
| 6,263,368 B1 | 7/2001 | Martin |
| 6,278,995 B1 | 8/2001 | Hawkinson |
| 6,327,622 B1 | 12/2001 | Jindal et al. |
| 6,374,300 B2 | 4/2002 | Masters |
| 6,396,833 B1 | 5/2002 | Zhang et al. |
| 6,601,084 B1 | 7/2003 | Bhaskaran et al. |
| 6,636,894 B1 | 10/2003 | Short et al. |
| 6,650,641 B1 | 11/2003 | Albert et al. |
| 6,742,045 B1 | 5/2004 | Jordan et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 7,343,413 B2 | 3/2008 | Gilde et al. |
| 7,561,517 B2 | 7/2009 | Klinker et al. |
| 8,024,483 B1 | 9/2011 | Rothstein et al. |
| 2001/0037387 A1 | 11/2001 | Gilde et al. |
| 2002/0138618 A1 | 9/2002 | Szabo |
| 2004/0039820 A1 | 2/2004 | Colby et al. |
| 2004/0049596 A1 | 3/2004 | Schuehler et al. |
| 2004/0111635 A1 | 6/2004 | Boivie et al. |
| 2006/0095673 A1 | 5/2006 | Van Doren et al. |
| 2007/0192861 A1 | 8/2007 | Varghese |
| 2008/0162390 A1 | 7/2008 | Kapoor et al. |
| 2008/0181226 A1 | 7/2008 | Varier et al. |
| 2008/0256239 A1 | 10/2008 | Gilde et al. |
| 2009/0003204 A1 | 1/2009 | Okholm et al. |
| 2009/0106426 A1 | 4/2009 | Chen et al. |
| 2009/0209262 A1 | 8/2009 | Stamoulis et al. |
| 2009/0327514 A1 | 12/2009 | Foschiano et al. |
| 2010/0121972 A1 | 5/2010 | Samuels et al. |
| 2010/0315992 A1 | 12/2010 | Turanyi |
| 2011/0075675 A1 | 3/2011 | Koodli et al. |
| 2011/0179183 A1 | 7/2011 | Lindsay |
| 2012/0320788 A1 | 12/2012 | Venkataramanan et al. |
| 2013/0044741 A1 | 2/2013 | Lappetelainen et al. |
| 2013/0083661 A1 | 4/2013 | Gupta et al. |
| 2014/0036661 A1 | 2/2014 | Campbell |

FOREIGN PATENT DOCUMENTS

| | | |
|---|---|---|
| WO | 95/05712 A2 | 2/1995 |
| WO | 97/09805 A1 | 3/1997 |
| WO | 97/45800 A1 | 12/1997 |
| WO | 99/05829 A1 | 2/1999 |
| WO | 99/06913 A1 | 2/1999 |
| WO | 99/10858 A2 | 3/1999 |
| WO | 99/39373 A2 | 8/1999 |
| WO | 99/64967 A1 | 12/1999 |
| WO | 00/04422 A2 | 1/2000 |
| WO | 00/04458 A1 | 1/2000 |

OTHER PUBLICATIONS

"Servlet/Applet/HTML Authentication Process With Single Sign-On," Research Disclosure 429128, IBM Corporation, pp. 163-164, Jan. 2000. cited by other.
"Transmission Control Protocol," Wikipedia, the free encyclopedia, http://en.wikipedia.org/wiki/Transmission_Control_Protocol, pp. 1-18, last accessed Aug. 1, 2012.
Office Communication for U.S. Appl. No. 13/802,169, mailed Oct. 9, 2014, 11 pages.
Office Communication for U.S. Appl. No. 13/461,675, mailed Aug. 14, 2014, 33 pages.
FIPS 197, Advanced Encryption Standard (AES), Nov. 26, 2001, NIST, all pages.
Official Communication for U.S. Appl. No. 13/461,675, mailed Jan. 27, 2014, 28 pages.
International Search Report and Written Opinion for International Patent Application PCT/US2013/038168 mailed Aug. 14, 2013.
Official Communication for U.S. Appl. No. 13/802,169, mailed May 27, 2015, 10 pages.
Office Communication for U.S. Appl. No. 13/802,331, mailed Jun. 5, 2015, 30 pages.

(56) References Cited

OTHER PUBLICATIONS

Office Communication for U.S. Appl. No. 13/802,254, mailed Sep. 14, 2015, 7 pages.
Official Communication for U.S. Appl. No. 13/802,169, mailed Feb. 5, 2015, 10 pages.
Official Communication for U.S. Appl. No. 13/802,254, mailed May 19, 2015, 16 pages.
Official Communication for U.S. Appl. No. 13/772,194, mailed Jul. 25, 2014, 23 pages.
Official Communication for U.S. Appl. No. 13/772,194, mailed Jan. 26, 2015, 21 pages.
Office Communication for U.S. Appl. No. 13/772,194, mailed Jul. 28, 2015, 7 pages.
Official Communication for U.S. Appl. No. 13/772,194, mailed Apr. 15, 2015, 9 pages.
Office Communication for U.S. Appl. No. 13/461,675, mailed Nov. 5, 2015, 37 pages.
F5 Networks, Inc., "TMOS Management Guide for BIG-IP Systems," https://support.f5.com/kb/en-us/products/big-ip_ltm/manuals/product/tmos_management_guide_10_1.html, publication date Jan. 20, 2011, accessed on Dec. 14, 2015 (520 pages).
Office Communication for U.S. Appl. No. 13/802,254, mailed Jan. 15, 2016, 8 pages.
Office Communication for U.S. Appl. No. 13/802,331, mailed Dec. 23, 2015, 33 pages.
Official Communication for U.S. Appl. No. 13/461,675 mailed Aug. 26, 2016, 12 pages.

HOT SERVICE FLOW HARDWARE OFFLOADS BASED ON SERVICE PRIORITY AND RESOURCE USAGE

CROSS-REFERENCE TO RELATED APPLICATIONS

This Utility patent application is a Continuation of U.S. patent application Ser. No. 13/772,194, filed on Feb. 20, 2013, which is based on U.S. Provisional Patent Application No. 61/674,521, filed on Jul. 23, 2012, entitled "ADAPTIVE HOT SERVICE FLOW HARDWARE OFFLOADS BASED ON SERVICE PRIORITY AND RESOURCE USAGE," the benefits of which are claimed under 35 U.S.C. §120 and §119(e), and which are both further incorporated by reference in their entireties.

TECHNICAL FIELD

The present subject innovations relate generally to packet traffic management and, more particularly, but not exclusively to determining when network connection flow control data should be off-loaded to a data flow segment stored in a hardware high-speed cache based in part on service priorities and resource usage.

BACKGROUND

The expanded use of the Internet has increased communication connections between client devices and server devices. Often, a client device establishes a network connection with a server device by using well-known protocols, such as Transmission Control Protocol/Internet Protocol ("TCP/IP"), User Datagram Protocol ("UDP"), and the like. This network connection may be identified by one characteristic or a combination of characteristics, such as a source port, a destination port, a source address, a destination address, a protocol, and the like. Typically, the source address, destination address, destination port, and protocol are relatively fixed for a network connection between a client device and a server device. Thus, the source port may be utilized to uniquely identify a connection between the client device and the server device. Additionally, the expansion of the Internet has led to improvements in packet traffic management. It is with respect to these considerations and others that the subject innovations have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings, wherein.

DETAILED DESCRIPTION

Figure 1:
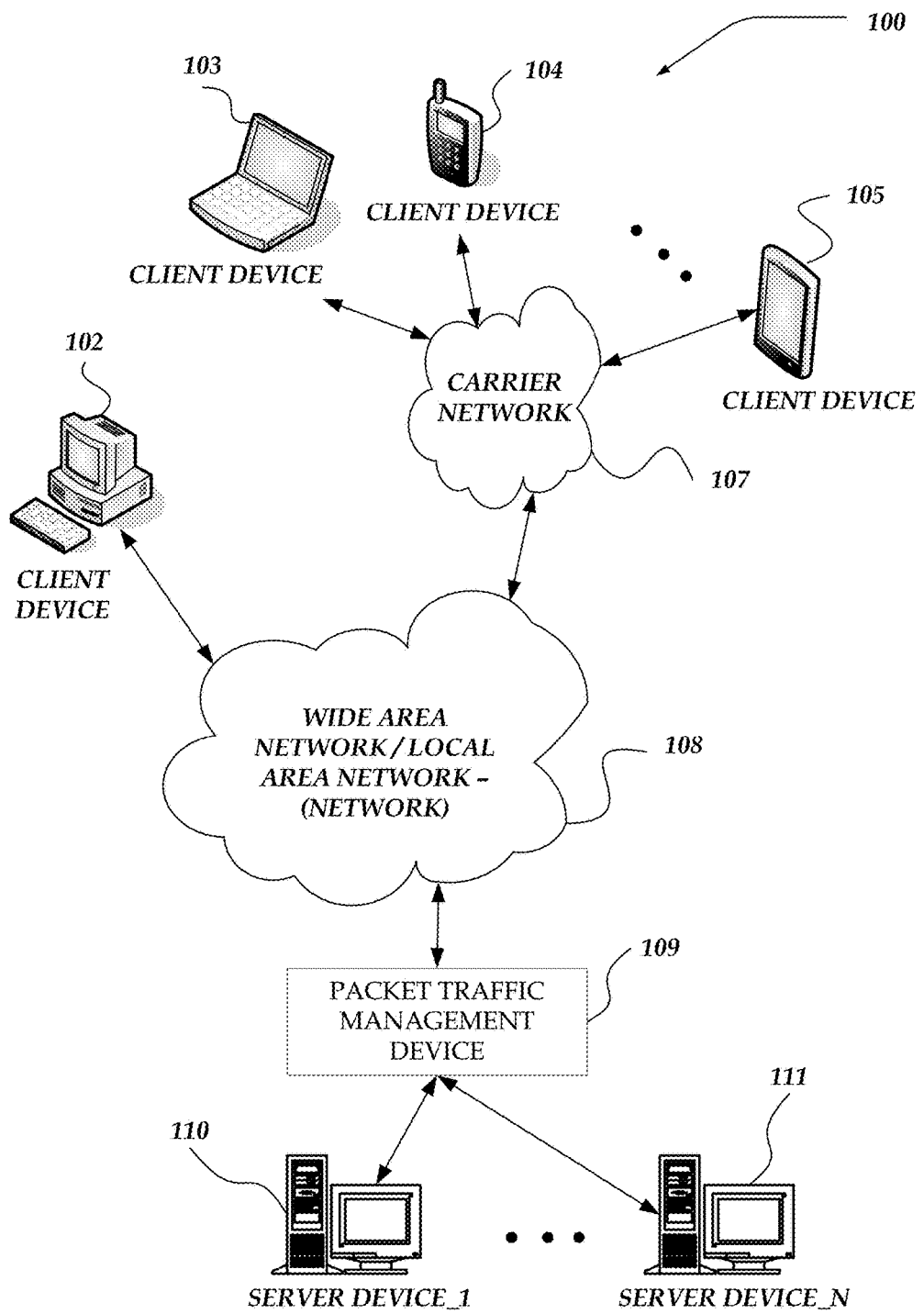
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "SYN" refers to a packet transmitted utilizing TCP that includes a set synchronize control flag in a TCP header of the packet.

As used herein, the term "ACK" refers to a packet transmitted utilizing TCP that includes a set acknowledgment flag in a TCP header of the packet.

As used herein, the term "SYN_ACK" refers to a packet transmitted utilizing TCP that includes a set synchronize control flag and a set acknowledgment flag in a TCP header of the packet.

As used herein, the term "FIN" refers to a packet transmitted utilizing TCP that includes a set no more data from sender flag in a TCP header of the packet.

As used herein, the term "FIN_ACK" refers to a packet transmitted utilizing TCP that includes a set no more data from sender flag and a set acknowledgment flag in a TCP header of the packet. FIN_ACK compress a FIN and ACK into one TCP packet.

As used herein, the term "tuple" refers to a set of values that identify a source and destination of a connection. In one embodiment, a 5 tuple may include a source address, a destination address, a source port, a destination port, and a protocol identifier. In at least one of the various embodiments, tuples may be used to identify network flows (e.g., connection flows). However, a tuple need not be a 5 tuple, and other combinations of the above may also be used.

As used herein, the terms "network flow," "connection flow,", and "flow" refer to a network session that may be established between two endpoints. A connection flow may include network packets that flow from a first endpoint towards the second endpoint, and network packets that flow from the second endpoint towards the first endpoint, each of these activities indicate directional flows within a connection flow. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may impaired if network packets may be routed using varying paths and/or directed different endpoints.

As used herein, the term "genuine connection flow," refers to a connection flow that may have been determined to be associated with an operative client-server communication session. In contrast, a non-genuine connection flow may be associated with a malicious attack such as a SYN flood attack. In at least one of the various embodiments, characteristics a genuine connection flows may include TCP/IP handshaking complete, evidence of bi-directional network packet exchange, or the like. Likewise, evidence that a connection flow may be non-genuine may include half-open connections (incomplete handshaking and connection setup), few if any network packets exchanged, or the like.

As used herein, the term "hot connection flow," refers to a connection flow that may have been determined to be a candidate for off loading to a data flow segment. Hot flow connections may have characteristics such high-bandwidth utilization, quality of service priority (QOS), or the like.

As used herein, the term "high speed flow cache" refers to memory based cache used for storing flow control data that corresponds to connection flows. The cache may be accessible using, dedicated busses that may provide very fast performance based on a combination of factors that may include, wide-busses, fast clock speeds, dedicated channels, specialized read and/or write buffer, hardware proximity, temperature control, or the like. Also, the high speed flow cache may be comprised of very fast random access memory (RAM) components such as, static random access memory (SRAM), asynchronous SRAM, burst SRAM, extended data output dynamic RAM (EDO DRAM), or the like. In most cases, the high performance components comprising the high speed flow cache often are relatively expensive in terms of consumption of processing resources, as well as sometimes monetary costs. Thus, the high speed flow cache may comprise valuable "real estate" within a traffic management device, for which optimizing their use is desirable, where such value of the space may be based on a limitation of physical component space, processing space, or the like.

As used herein, the term "service" refers to a type of application that employs a connection flow. Non-exhaustive, non-limiting examples of such services include, messaging services, File Transfer Protocol ("FTP") services, database services, or web based services such as HyperText Markup Language ("HTML") services.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards improving the performance of network traffic management devices by optimizing the management of hot connection flows. In at least one of the various embodiments, a packet traffic management device ("PTMD") may employ a data flow segment ("DFS") component and control segment ("CS") component. In at least one of the various embodiments, the CS may perform high-level control functions and per-flow policy enforcement for connection flows maintained at the DFS, while the DFS may perform statistics gathering, per-packet policy enforcement (e.g., packet address translations), or the like, on connection flows maintained at the DFS.

The CS may be utilized to generate flow control data for connection flows that may be offloaded to the DFS based on connection flow requests received at the packet traffic management device. In one embodiment, the CS may receive a new connection flow request, such as a SYN packet, sent by a client device. The CS may generate and cache a connection flow identifier for the connection flow request. In at least one of the various embodiments, the DFS may include high-speed flow caches and other high-speed components. In at least one of the various embodiments, the high-speed flow cache may be enabled to store a defined amount of flow control data that may limit the number of connection flows that may be offloaded to the DFS for handling. In at least one of the various embodiments, making efficient use of the high speed flow cache capacity may be improved by maximizing the number of hot connection flows and minimizing the number of malicious and/or in-operative connections flows (e.g., non-genuine flows) that may be have flow control data stored in the high-speed flow cache.

In at least one of the various embodiments, if a new network connection flow may be received it may be forwarded to a control segment (CS). In at least one of the various embodiments, the CS may generate the flow control data for the new network connection flow. In one embodiment, if the CS determines that the new network connection flow should be offloaded to the DFS, the CS may send a control message that may include the flow control data to the DFS. In at least one of the various embodiments, the DFS may store the received flow control data in the high-speed flow cache that may correspond to the DFS.

In at least one of the various embodiments, the CS may receive connection flows that may be evicted from the DFS. In at least one of the various embodiments, if the evicted connection remains valid and/or active, the CS may begin handling the network packets for the transferred connection flow (e.g., the CS may take over the packet level control in addition to providing the flow level control and policy enforcement).

In at least one of the various embodiments, in conjunction with managing the connection flows the CS may analyze flow statistics, priorities, characteristics of the flows, quality of service for flows, and a flow application to identify hot connection flows, as described in more detail below. In some embodiments the CS may employ autonomous self-adaptive mechanisms to automatically detect and learn about hot connection flows, hot service flows, hot service directions, and prioritize the identified hot service flows. When hot connection flows are identified, the CS may determine if any should be handled by the DFS for improved performance based in part on metrics that include resource usage and service priority. Prioritization may include keeping existing flows in the DFS, for example, and rejecting new flows that cannot be put into the DFS due to resource conflicts, such as a table being full, a hash bucket being full, or the like.

In some embodiments, a user configurable service priority and resource usage limit may be assigned to each service for distinguishing different service offload criteria. In one embodiment, the resource usage limit may set an upper limit threshold or percentage capacity for offload decisions.

In some embodiments, the CS may analyze network activity for each service flow to determine runtime flow statistics for each type of service, and to obtain a picture of the real time traffic activity, at least for connections that may be candidates for possible offloading to the DFS. The CS may obtain refreshes of the traffic statistics to accurately reflect the characteristics of the real time traffic and current loads. In one embodiment, the characteristics may include direction pattern and service pattern information. The CS may then use these patterns to differentiate services and service directions, and to prioritize services based on pattern data and to further assign each service a real time service priority. In one embodiment, the CS may employ a configurable direction-bound ratio threshold for tuning offload decisions for flows within a same service to address traffic imbalance between, for example, server-bound and/or client-bound flows. In one embodiment, the real time traffic pattern data may be recorded and time stamped to enable tuning of the system, such as in a feedback control loop approach.

In some embodiments, candidate hot service flows may be modified based on service priorities. For example, a user-configurable service priority and a real time priority may be obtained from monitoring network activity. A relative weight may be given to the user-set service priority versus the real-time priority based on a configurable system ratio, allowing for further tuning.

In still other embodiments, the candidate hot service flows may be further modified based on a service resource usage limit, where both the service priority and the usage limit are employed to modify the candidate service flows to be offloaded for hardware acceleration.

In at least one of the various embodiments, offloading a connection flow to the DFS for handling enables the DFS to manage packet translation using flow control data that may have generated by the CS. In at least one of the various embodiments, connection flows offloaded to the DFS may benefit from performance improvements that arising from the high-performance hardware that may comprise the DFS. In at least one of the various embodiments, storing the flow control data for connection flows in the high-speed flow cache that may correspond to the DFS may occur if the connection flow may be offloaded to the DFS for handling.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client devices 102-105, packet traffic management device ("PTMD") 109, and server devices 110-111. Network 108 is in communication with and enables communication between client devices 102-105, wireless network 107, and PTMD 109. Carrier network 107 further enables communication with wireless devices, such as client devices 103-105. PTMD 109 is in communication with network 108 and server devices 110-111.

One embodiment of client devices 102-105 is described in more detail below in conjunction with FIG. 2. In one embodiment, at least some of client devices 102-105 may operate over a wired and/or a wireless network, such as networks 107 and/or 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited and may also include other portable devices, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to send and/or receive content, or the like. The client application may further provide information that identifies itself, including a type, capability, name, or the like. In one embodiment, client devices 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PTMD 109, server devices 110-111, or other computing devices.

Client devices 102-105 may further be configured to include a client application that enables an end-user to log into an end-user account that may be managed by another computing device, such as server devices 110-111, or the like. Such end-user accounts, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client devices 103-105 and its components with network 108. Wireless carrier network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HS-DPA"), Long Term Evolution ("LTE"), and the like. In essence, carrier network 107 may include virtually any wireless communication mechanism by which information may travel between client devices 103-105 and another computing device, network, and the like.

Network 108 is configured to couple network devices with other computing devices, including, server devices 110-111 through PTMD 109, client device 102, and client devices 103-105 through wireless carrier network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network device capable of managing network traffic between client devices 102-105 and server devices 110-111. Such devices include, for example, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, a capacity of a server, content requested, or a host of other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In one embodiment, the control segment may provide instructions, such as, for example, a packet translation instruction, to the data flow segment to enable the data flow segment to route received packets to a server device, such as server device 110-111. The data flow segment may include hardware-optimized operations that perform statistics gathering, per-packet policy enforcement (e.g., packet address translations), high-speed flow caches, or the like, on connection flows maintained at DFS between client devices, such as client devices 102-105, and server devices, such as server devices 110-111.

Server devices 110-111 may include virtually any network device that may operate as a website server. However, server devices 110-111 are not limited to website servers, and may also operate as messaging server, a File Transfer Protocol ("FTP") server, a database server, content server, or the like. Additionally, each of server devices 110-111 may be configured to perform a different operation. Devices that may operate as server devices 110-111 include various network devices, including, but not limited to personal computers, desktop computers, multiprocessor systems, microprocessor-based or programmable consumer electronics, network PCs, server devices, network appliances, and the like.

Although FIG. 1 illustrates server devices 110-111 as single computing devices, the invention is not so limited. For example, one or more functions of each of server devices 110-111 may be distributed across one or more distinct network devices. Moreover, server devices 110-111 are not limited to a particular configuration. Thus, in one embodiment, server devices 110-111 may contain a plurality of network devices that operate using a master/slave approach, where one of the plurality of network devices of server devices 110-111 operate to manage and/or otherwise coordinate operations of the other network devices. In other embodiments, the server devices 110-111 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
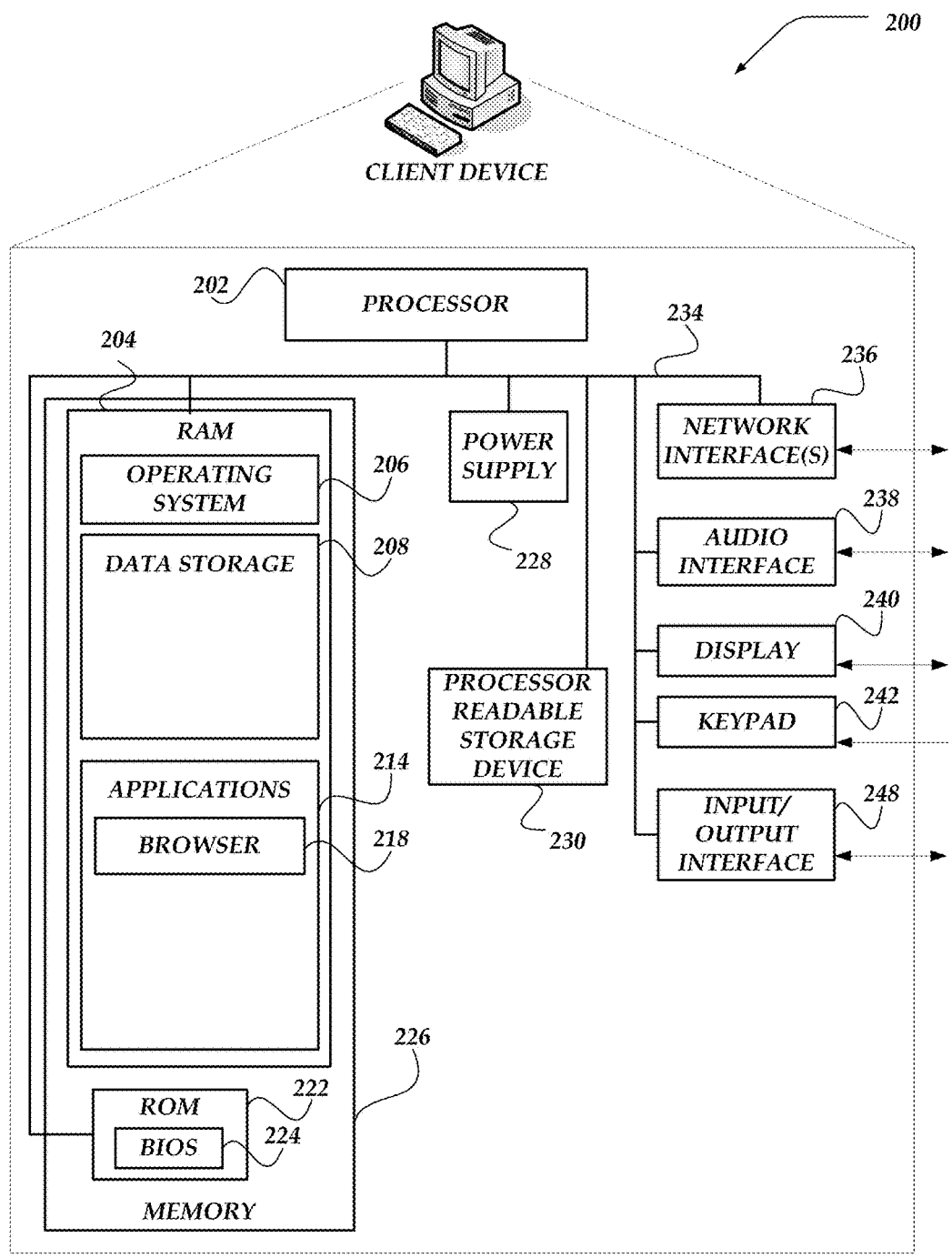
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via a bus 234. Client device 200 also includes a power supply 228, one or more network interfaces 236, an audio interface 238, a display 240, a keypad 242, and an input/output interface 248.

Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client device 200 may also include a GPS transceiver (not shown) to determine the physical coordinates of client device 200 on the surface of the Earth. A GPS transceiver typically outputs a location as latitude and longitude values. However, the GPS transceiver can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, a GPS transceiver can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage device 230, a disk drive or other computer readable storage medias (not shown) within client device 200.

Processor readable storage device 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage device 230 may also be referred to herein as computer readable storage media.

Applications 214 may include computer executable instructions which, when executed by client device 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client device. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as PTMD 109 and/or with server devices 110-111.

Illustrative Network Device

Figure 3:
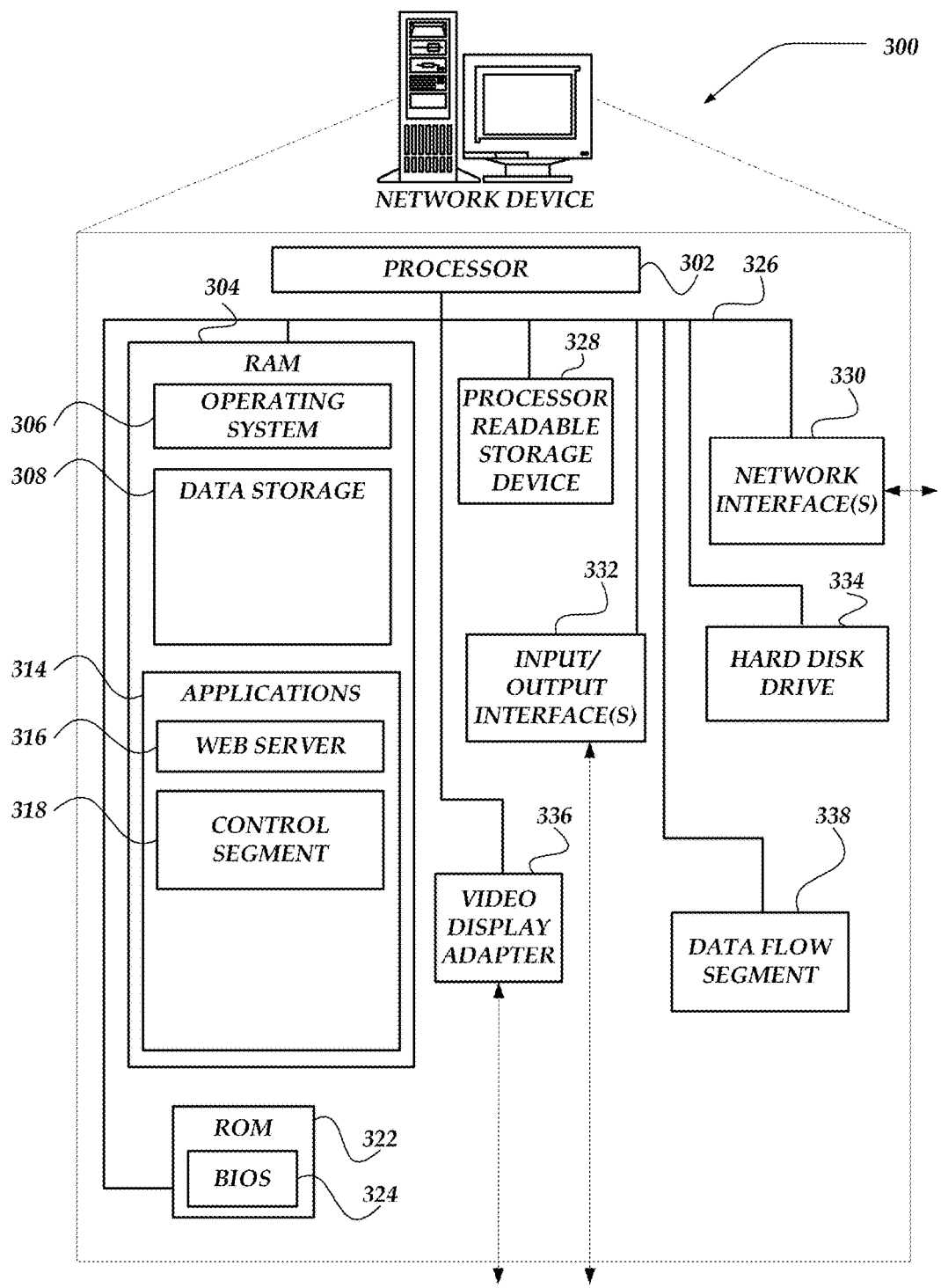
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example PTMD 109 of FIG. 1, server devices 110-111 of FIG. 1, and/or other network devices.

Network device 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. In one embodiment, at least some of data store 308 might also be stored on another component of network device 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computing device. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client device, such as client devices 102-105 of FIG. 1, to browse websites, upload user data, or the like.

Network device 300 may also include DFS 338 for maintaining connection flows between client devices, such as client devices 102-105 of FIG. 1, and server devices, such as server devices 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. DFS 338 may collect statistics for both hardware and software active flows for a given connection, a given service, and/or a given direction of flow. DFS 338 may provide at least some of the collected statistics to CS 318 for use, in part, in identifying candidate hot service flow connections for DFS offloading.

In some embodiments, DFS 338 may route, switch, forward, direct and/or otherwise handle packets based on rules for a particular connection flow signature (e.g., a 5 tuple of a received packet). Thus, DFS 338 may include capabilities and perform tasks such as that of a router, a switch, a routing switch, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management.

In some embodiments, DFS 338 may provide connection flow status updates to CS 318. In one embodiment, a connection flow status update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow status update and/or the connection flow delete update may be provided to CS 318 periodically, at predefined time intervals, or the like. In some embodiments, DFS 338 may stagger a time when a plurality of connection flow status updates is provided to CS.

In some other embodiments, DFS 338 may include a plurality of data flow segments. In one non-limiting example, a first data flow segment within DFS 338 may forward packets received from a client device to a server device, while a second data flow segment within DFS 338 may forward and/or route packets received from a server device to a client device. In at least one of the various embodiments, DFS 338 may also be implemented in software. In other embodiments, DFS 338 may be configured in specialized hardware, such as on at least one Application Specific Integrated Circuit (ASIC) chip. The ASIC chip can include logic that performs the actions described herein for DFS 338. In some embodiments, the ASIC chip may further include its own local memory components, including its own local SRAM, or other high speed flow cache components.

In other embodiments, DFS 338 may also be implemented within one or more field-programmable gate arrays (FPGA) (not shown), instead of, or in addition to, the ASIC chip, along with various high speed flow cache components.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server device, such as server device 110-111 of FIG. 1. In some other embodiments, CS 318 may forward and/or route packets between a client device and a server device independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318. For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one embodiment, split operations between a control segment and a data flow segment may be implemented using mechanisms such as described in more detail in U.S. Pat. No. 7,343,413, filed Mar. 21, 2001, and entitled "Method and System for Optimizing a Network by Independently Scaling Control Segments and Data Flow," which is hereby incorporated by reference in its entirety into this patent application.

In at least one of the various embodiments, CS 318 may be configured to generate an identifier for each connection flow established at DFS 338. In some embodiments, CS 318 may utilize a sequence number of a SYN to generate an identifier for a corresponding connection flow. In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

Figure 4A:
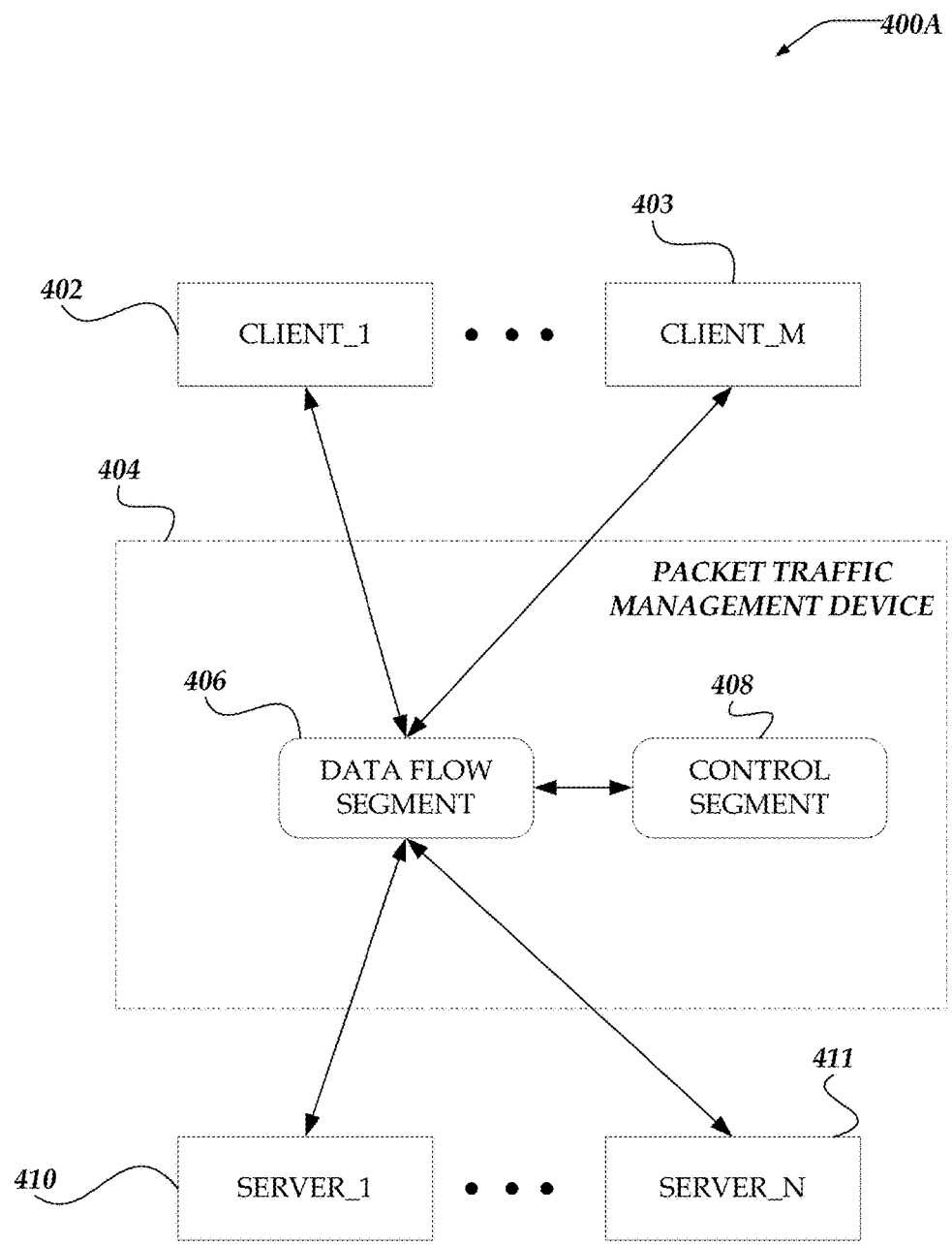
FIGS. 4A and 4B illustrate overview system diagrams generally showing embodiments of a packet traffic management device disposed between client devices and server devices in accordance with the embodiments.

FIG. 4A illustrates a system diagram generally showing one embodiment of a system with a packet traffic management device disposed between client devices and server devices. System 400A may include packet traffic management device ("PTMD") 404 disposed between client devices 402-403 and server devices 410-411. Client devices 402-403 may include Client_1 through Client_M, which may include one or more client devices, such as client devices 200 of FIG. 2. Server devices 410-411 may include Server_1 through Server_N, which may include one or more server devices, such as server devices 110-111 of FIG. 1.

In one embodiment, PTMD 404 may be an embodiment of PTMD 109 of FIG. 1. PTMD 404 may include data flow segment ("DFS") 406 in communication with control segment ("CS") 408. In at least one of the various embodiments, DFS 406 may be an embodiment of DFS 338 of FIG. 3, and CS 408 may be an embodiment of CS 318 of FIG. 3.

CS 408 may be configured to communicate with DFS 406, client devices 402-403 and/or server devices 410-411 independent of DFS 406, and/or any combination thereof. CS 408 may establish connection flows at DFS 406. In some embodiments, CS 408 may establish a connection flow at DFS 406 by providing instructions including flow control data to DFS 406 that enables DFS 406 to forward packets received at PTMD 404. In one embodiment, CS 408 may perform a load balancing operation to select a server device of server devices 410-411 to receive packets sent from a client device, such as client device 402. In some other embodiments, CS 408 may generate and cache a connection flow identifier to be provided to DFS 406 when the connection flow is established.

DFS 406 may be configured to facilitate communications between client devices 402-403 and server devices 410-411. DFS 406 may process and forward packets received at PTMD 404 based on the instructions and flow control data received from CS 408. For example, in one embodiment, DFS 406 utilizes the instructions and/or flow control data to forward packets received from client device 402 to server device 410 and to forward packets received from server device 410 to client device 402. In some embodiments, DFS 406 may forward predetermined packets to CS 408, such as, but not limited to, new connection flow requests (e.g., associated with a SYN). In yet other embodiments, DFS 406 may notify CS 408 that a packet was received and forwarded. In one non-limiting, non-exhaustive example, DFS 406 may notify CS 408 that an ACK was received from client device 402 and forwarded to server device 410. In at least one of the various embodiments, DFS 406 may also provide connection flow updates and a corresponding connection flow identifier to CS 408. CS 408 may compare the corresponding connection flow identifier with the cached identifier to determine if the connection flow update is valid.

In at least one of the various embodiments, DFS 406 may send evict messages to CS 408 if a connection flow is evicted from the DFS 406. In at least one of the various embodiments, DFS 406 may evict a connection flow if new flows arrive and the capacity of the DFS to handle new connection flow may be exceeded. In at least one of the various embodiments, evictions from DFS 406 may occur if the high speed flow cache for storing flow control data exhausts its ability to store the flow control data for new connection flows. In at least one of the various embodiments, evict messages sent from DFS 406 to CS 408 may contain enough information to fully identify the connection flow (e.g., endpoints, ports, sequent numbers, flow state, or the like). It should be noted however, in other embodiments, CS 408 may also send an evict message to DFS 406 based on flow analysis decisions, capacity determinations, usage predictions, or the like. In some embodiments, CS 408 might explicitly send an evict message to DFS 406 in advance, for example, to free high speed flow cache, or the like.

In at least one of the various embodiments, CS 408 may receive and route packets associated with evicted connection flows, thereby taking on some of the duties of DFS 406. In at least one of the various embodiments, some new connection flows may not be offloaded to DFS 406, for example, when CS 408 determines that the connection flows may be managed on the CS or when the CS determines that more information may be required to determine if the connection flow should be offloaded to DFS 406.

Although PTMD 404 illustrates DFS 406 and CS 408 as two partitions within a single PTMD 404, the invention is not so limited. Rather, in some embodiments, DFS 406 and CS 408 may be functional blocks in a same PTMD 404 (i.e., a same chassis/computing device). In other embodiments, DFS 406 may be implemented by one or more chassis/computing devices separate from one or more other chassis/computing devices that may be utilized to implement CS 408. In yet other embodiments, CS 408 may be a module that plugs into DFS 406. Additionally, it is envisaged that the functionality of either DFS 406 and/or CS 408 may be separately implemented in software and/or hardware.

Figure 4B:
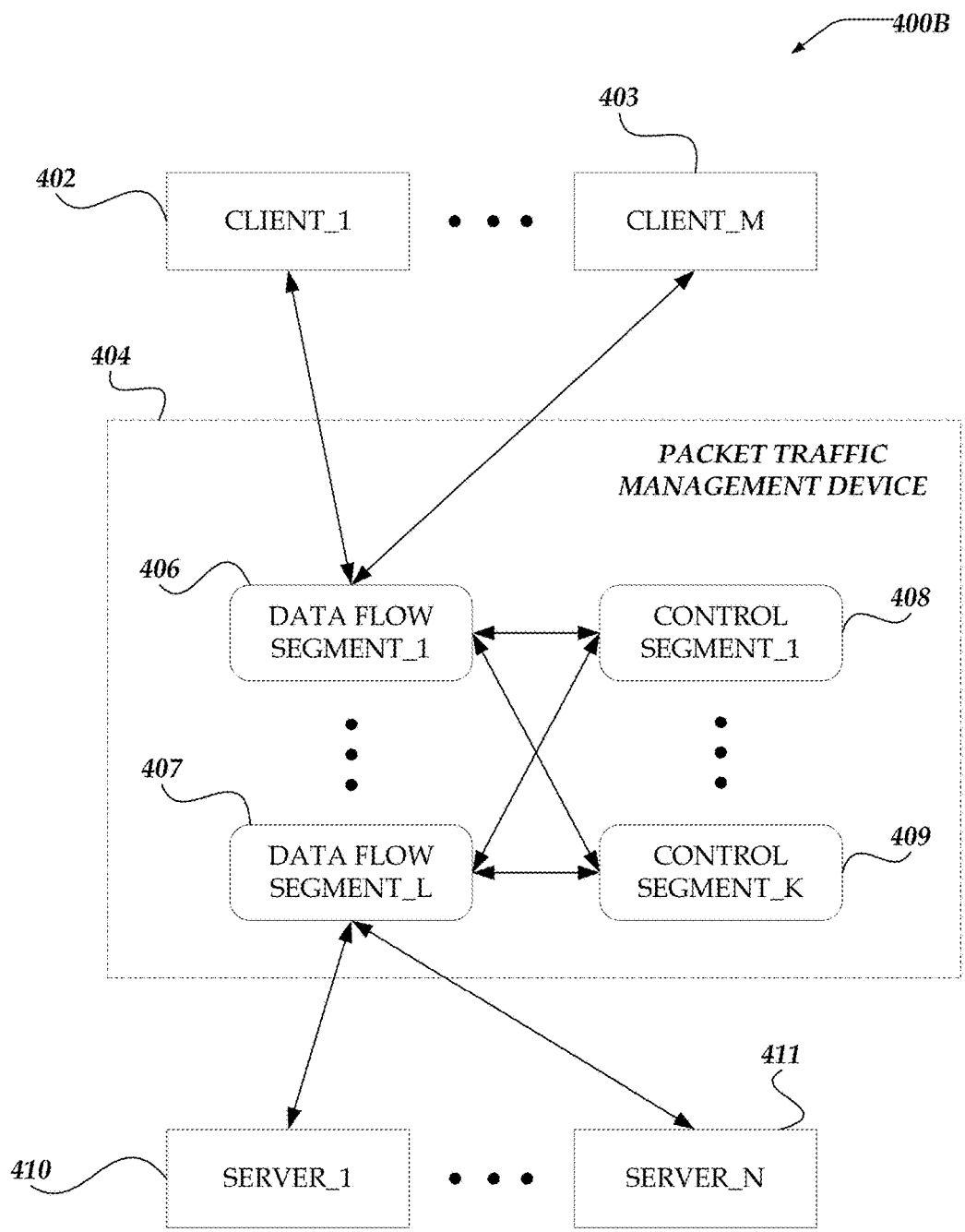

FIG. 4B illustrates a system diagram generally showing one embodiment of a system with a packet traffic management device disposed between client devices and server devices. System 400B may include packet traffic management device ("PTMD") 404 disposed between client devices 402-403 and server devices 410-411. Client devices 402-403 may include Client_1 through Client_M, which may include one or more client devices, such as client devices 102-105 of FIG. 1. Server devices 410-411 may include Server_1 through Server_N, which may include one or more server devices, such as server devices 110-111 of FIG. 1.

In one embodiment, PTMD 404 may be an embodiment of PTMD 404 of FIG. 4. PTMD 404 may include data flow segments ("DFS") 406-407 and control segments ("CS") 408-409. DFS 406-407 may include a plurality of data flow segments, each of which may be an embodiment of DFS 406 of FIG. 4A. CS 408-409 may include a plurality of control flow segments, each of which may be an embodiment of CS 408 of FIG. 4.

In some embodiments, data communicated between client devices 402-403 and server devices 410-411 may flow through one or more data flow segments 406-407. In one embodiment, data from client devices 402-403 may flow through a first DFS, such as DFS 406 and data from server devices 410-411 may flow through a second DFS, such as DFS 407.

In at least one of the various embodiments, one or more data flow segments of DFS 406-407 may communicate with one or more control segments of CS 408-409. Similarly, one or more control segments of CS 408-409 may communicate with one or more data flow segments of DFS 406-407. In some embodiments, each control segment of CS 408-409 may communicate (not shown) with other control segments of CS 408-409. In other embodiments, each data flow segment of DFS 406-407 may communicate (not shown) with other data flow segments of DFS 406-407.

Also, in at least one of the various embodiments, connection flows may be split into flow portions based on the direction of network packet travel. In at least one of the various embodiments, the network packets coming from the client may treated as a separate connection flow and the network packets coming from a server and directed towards a client may be treated as a separate connection flow. In at least one of the various embodiments, this enables optimizations based on the amount, service type, direction, or the like, of network packet traffic of a particular split connection flow. In at least one of the various embodiments, this may enable the upload and download direction portion of connection flows to be split across CS 408-409 and DFS 406-407 based on the characteristics of the upload and download portions of the connection flows. For example, in at least one of the various embodiments, if downloading streaming video may be a very asymmetric operation having many network packets download to the client and few uploaded. In at least one of the various embodiments, the upload and download portions of connection flow in the download direction may be optimized independent with one portion using the DFS and a high-speed flow cache and the other portion may be handled on the CS using lower performing (e.g., less expensive) resources.

Figure 5:
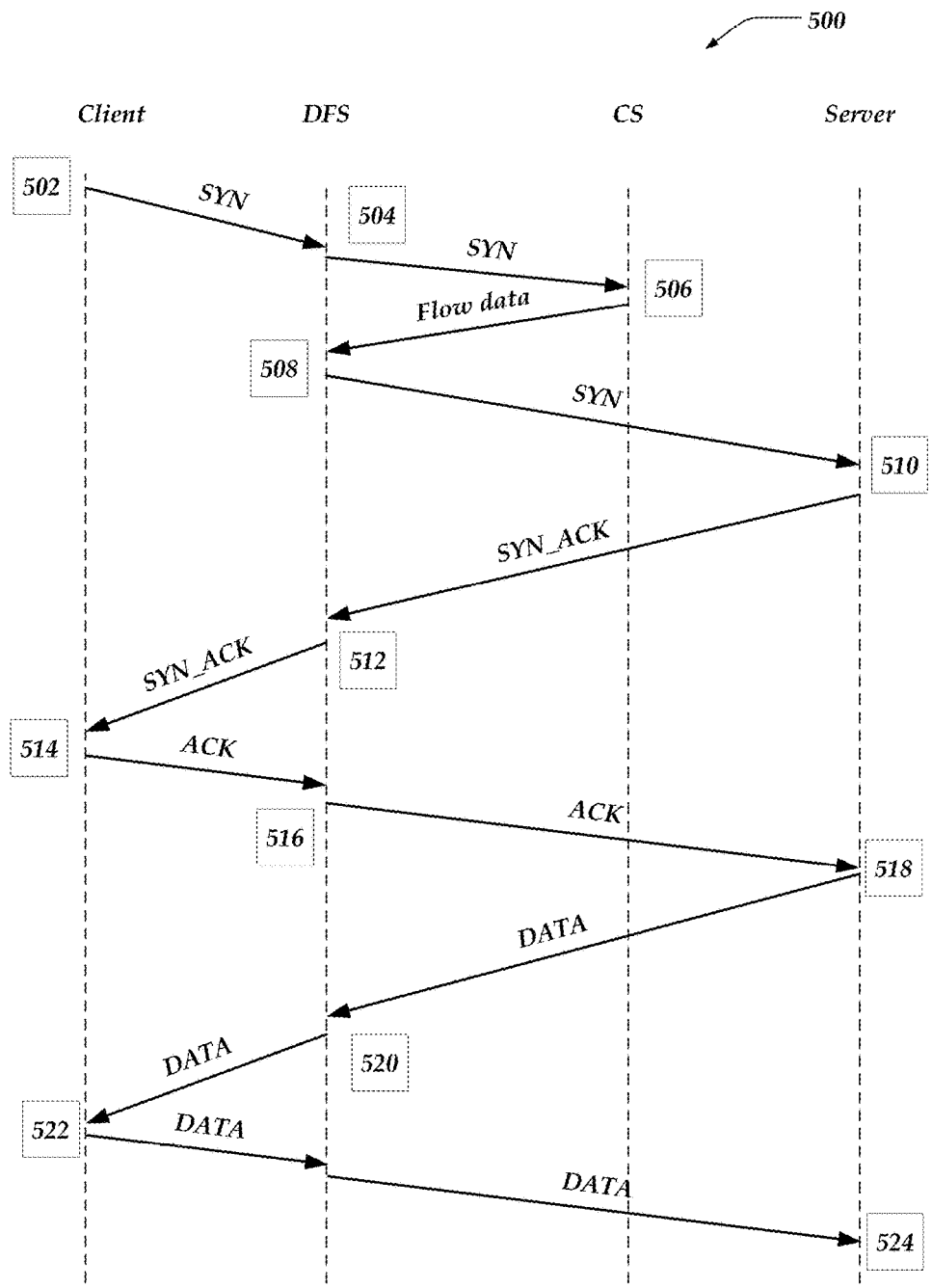
FIG. 5 illustrates a sequence diagram generally showing one embodiment of a sequence for terminating a connection flow at a data flow segment and establishing a new connection flow at the data flow segment in accordance with the embodiments.

FIG. 5 illustrates an embodiment of a sequence for establishing a connection flow and offloading the new connection flow to the data flow segment (DFS). Sequence 500 may show an embodiment using TCP/IP networking protocol but one of ordinary skill the art will appreciate that the sequence diagram (or similar sequences) may generally apply to other networking protocols that may have other handshaking sequences as well. Also, even though sequence 500 depicts a sequence including one client, one DFS, one CS, and one application server, in at least one of the various embodiments, one or more, data flow segments, control segments, clients, and servers, may be participate in handshaking and in the connection flow offloading. Also, in at least one of the various embodiments, the connection flows may be split into upload and download portions of a connection flow, with each portion representing one direction of the connection flow.

In at least one of the various embodiments, sequence 500 begins at step 502 if a client initiates a connection with a network resource that may be managed by a PTMD, such as PTMD 109. If client may be initiating the connection using TCP/IP, a SYN packet may be sent to the PTMD.

At step 504 a SYN packet may be received at a DFS that may be part of a PTMD. In at least one of the various embodiments, at step 506, because the DFS may determine that the incoming connection represents a new connection flow, the DFS may forward the SYN packet to a CS. At step 506 a CS may examine the connection flow and may determine the appropriate flow control data for the new flow and send it to the DFS. In at least one of the various embodiments, CS may apply one or more stored rules that may be used to determine the flow control data for the new network connection flow. In at least one of the various embodiments, the stored rules may implement network traffic management services such as load balancing, application access control, or the like.

In at least one of the various embodiments, at step 508 the DFS may receive the flow control data from the CS and store it in a high speed flow cache. In at least one of the various embodiments, the flow control data may be used by the DFS to forward the SYN packet to an appropriate server and/or network resource as directed by the flow control data that may be provided by the CS.

In at least one of the various embodiments, at step 510 a server and/or network resource may receive the SYN packet and may respond by sending a SYN-ACK packet to the DFS. In at least one of the various embodiments, at step 512 the DFS may again use the flow control data stored in the high speed flow cache to map and/or translate the SYN_ACK from a server to the appropriate client.

In at least one of the various embodiments, at step 514 the client device that sent the initial SYN packet may receive the corresponding SYN_ACK and subsequently may respond with an ACK packet. In at least one of the various embodiments, at step 516 the DFS, using the stored flow control data to determine the network path to the server, may forward the ACK packet to the server.

In at least one of the various embodiments, at step 518 the server may receive the ACK packet corresponding to the client device. After the ACK may have been received, the network connection flow may be in an established state. In at least one of the various embodiments, during steps 520-524, using the established network connection flow, the server may begin exchanging application data with client. In at least one of the various embodiments, at this point, for each exchange of data, the DFS may use the flow control data that may be stored in the high speed flow cache to map between the application servers and the client to route the packets on the correct path to maintain the connection flow, and/or to determine whether a connection flow is to be evicted or otherwise moved from the DFS to the CS.

General Operation

Figure 6:
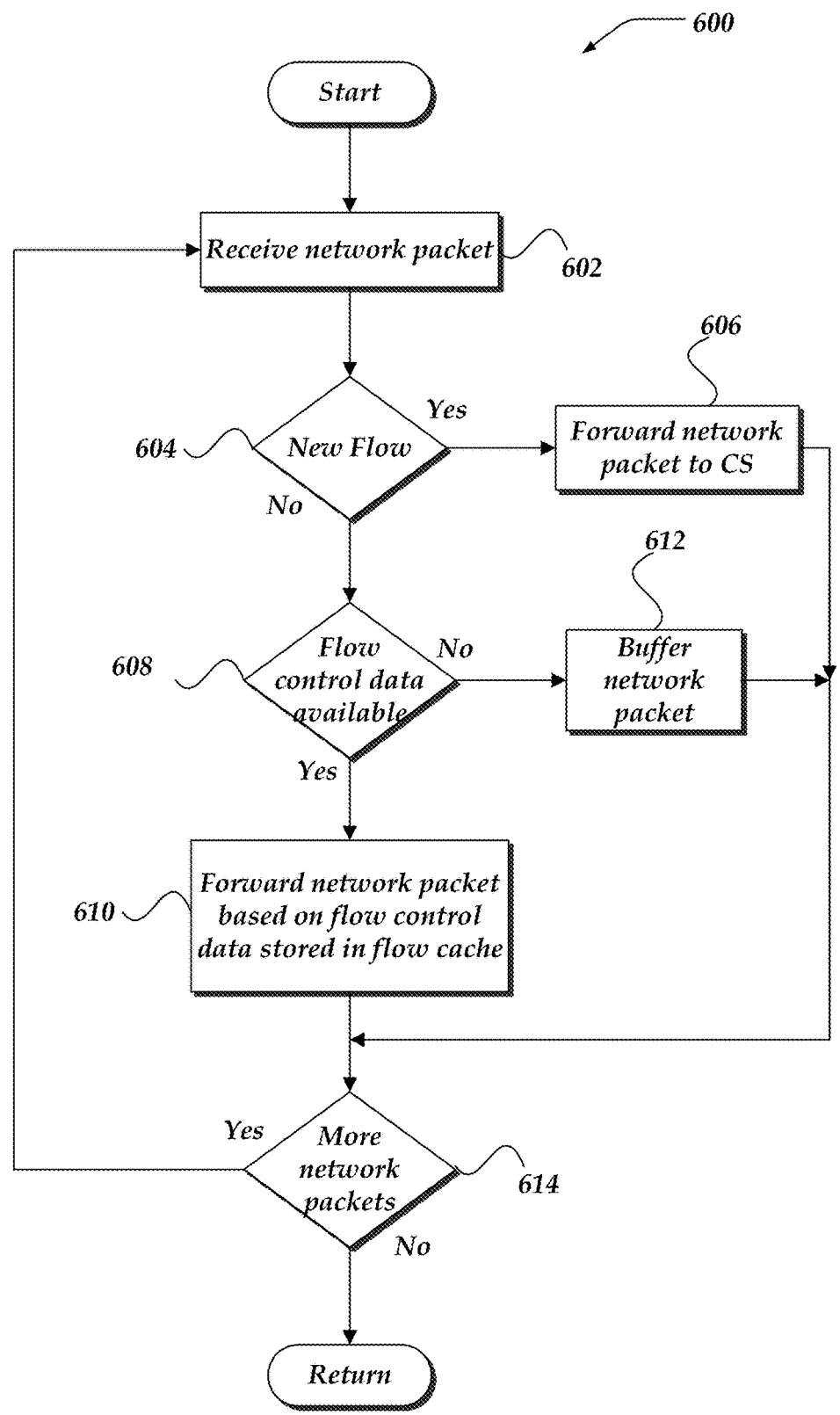
FIG. 6 shows a flowchart showing a process for packet traffic management in accordance with at least one of the various embodiments.

FIG. 6 shows a flowchart showing at least one of the various embodiments of a process for packet traffic management. In process 600, after a start block, at block 602 a network packet may be received by a DFS. In at least one of the various embodiments, the network packets may be received from network 108, and/or may have been forwarded through multiple networks, switches, routers, other PTMDs or the like.

At decision block 604, in at least one of the various embodiments, if the received network packet may be associated with a new connection flow, control may move to block 606. Otherwise, in at least one of the various embodiments, control may move to decision block 608.

In at least one of the various embodiments, a DFS may examine the connection flow and compare it the flow control data that may be stored in a high-speed cache. In at least one of the various embodiments, a tuple corresponding to the network packet may be examined to determine if the network packet is part of a new connection flow. If a tuple corresponding to the incoming network packet may not be found in the high-speed flow cache the DFS may determine that the network packet may be part of a new connection flow.

At block 606, in at least one of the various embodiments, the incoming network packet that may be associated with a new connection flow may be forwarded to a CS for further processing. In at least one of the various embodiments, the incoming network packet may be sent to a CS using a command bus that may enable DFS and CS components to exchange data and messages. Next, control may move decision block 614.

At decision block 608, in at least one of the various embodiments, if flow control data may be available for the connection flow associated with network packet, control may move to block 710. Otherwise, in at least one of the various embodiments, control may move to block 612.

At block 610, in at least one of the various embodiments, the DFS may forward the network packet to its next destination based on the flow control data and/or information associated with the network packet's corresponding connection flow that may be stored in the high speed flow cache that corresponds to the DFS. Next, in at least one of the various embodiments, control may move to decision block 614.

At block 612, in at least one of the various embodiments, the network packet having a previously seen tuple may be stored in a buffer on the DFS until flow control data may be provided by the CS.

In at least one of the various embodiments, a received network packet may be associated with a connection flow that has been previously been observed. However, in at least one of the various embodiments, if the flow control data from the CS may not be available, the DFS may store the network packets associated with the connection flow in a buffer until the relevant flow control data may be received from the CS.

Also, in at least one of the various embodiments, incoming network packets associated with unknown and/or new connection flows may be forwarded to the CS for buffering, rather than buffering on the DFS, until a flow control data determination may be made by the CS.

At decision block 614, in at least one of the various embodiments, if there may be more incoming network packets, control may loop back to block 602. Otherwise, in at least one of the various embodiments, control may be returned to a calling process.

Figure 7:
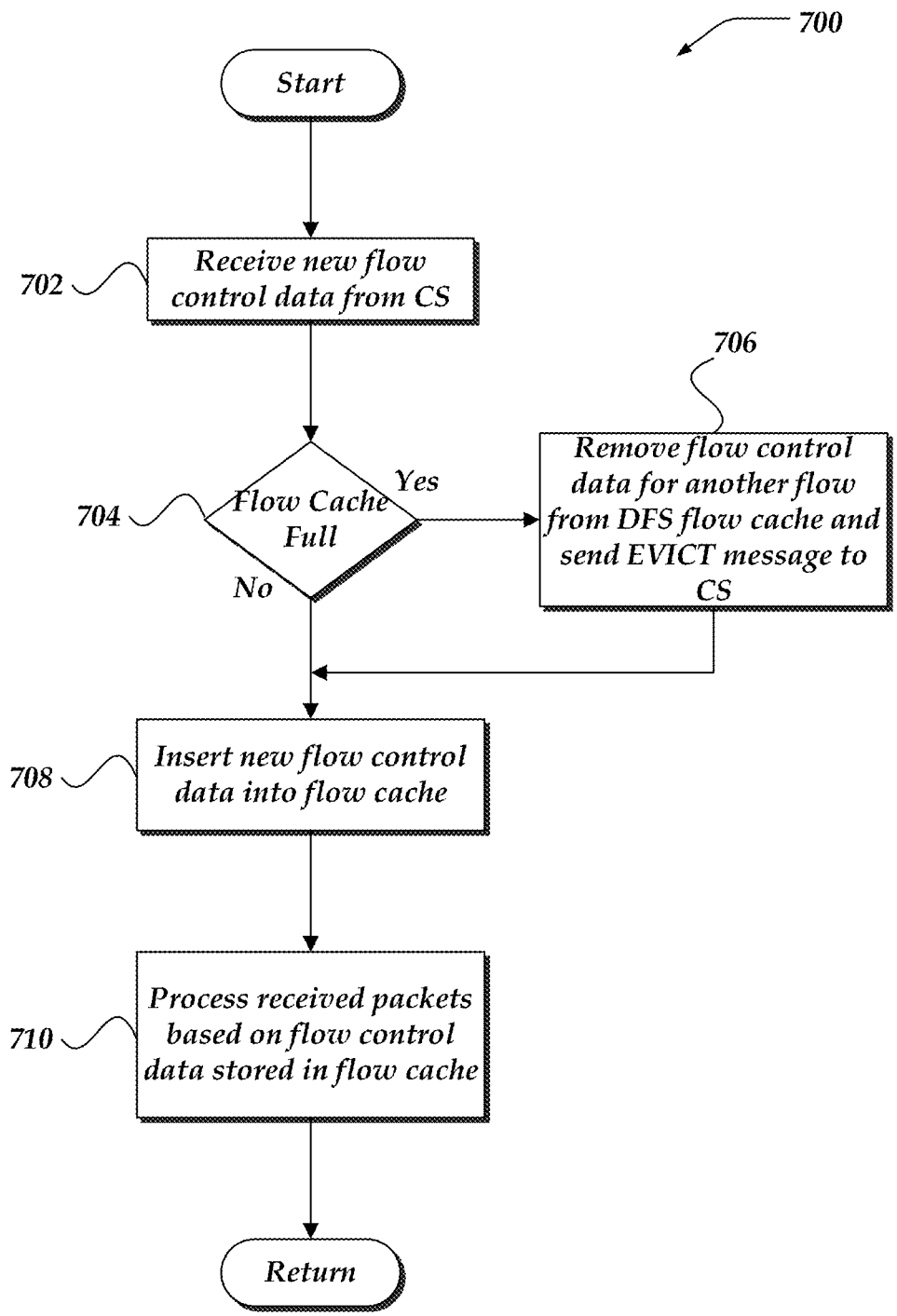
FIG. 7 shows a flowchart of a process for handling new connection flows at a data flow segment in accordance with at least one of the various embodiments.

FIG. 7 shows a flowchart of process 700, in at least one of the various embodiments, for handling new connection flows at a DFS. After a start block, at block 702 a DFS component may receive new flow control data from a CS. In at least one of the various embodiments, if new flow control data may be received, the DFS may store the flow data into a high-speed flow cache.

In at least one of the various embodiments, the new flow control data may be sent to the DFS as part of a "new flow" control message sent from the CS to the DFS.

At decision block 704, in at least one of the various embodiments, if the DFS high-speed flow cache may be full, control may move to block 706. Otherwise, in at least one of the various embodiments, control may move block 708.

In at least one of the various embodiments, the high-speed flow cache may be implemented using a hash such that the a hash key may be generated for each new connection flow based on properties of the connection flow such as the tuple, CS generated connection identifier, SYN cookie, or the like. In at least one of the various embodiments, if the range (number of unique values) of the hash key may be more than the number of slots in the high speed flow cache, the hash key may be truncated so the number of hash key value possibilities may be equal or similar to the number of slots in the high-speed flow cache. In at least one of the various embodiments, truncation of the hash key may increase the number of hash key collisions. If, in at least one of the various embodiments, a new connection flow hash key may cause hash key collision, the connection flow currently in the cache may get evicted (e.g., its flow control data is removed from the high speed cache and the responsibility for managing the flow may be transferred to the CS) to make room for the new connection flow.

At block 706, in at least one of the various embodiments, to make room for the new flow control data received from the CS, flow control data for a different, previously cached connection flow may be removed (e.g., evicted) from the DFS high-speed flow cache. Evictions may also be performed for other reasons, including, based on no detected activity for a connection flow over a period of time, or the like.

In at least one of the various embodiments, the DFS may send the CS a control message indicating that a connection flow may have been evicted from the DFS requiring the associated flow control data to be removed from the DFS high-speed flow cache. In at least one of the various embodiments, the eviction message may include information, such as, number of packets sent or received over this network flow, age of the network flow, tuple information, or the like. In at least one of the various embodiments, the control message sent to the CS may contain enough information to enable the CS to identify the network flow that may be evicted from the DFS. Moreover, in some embodiments, a control message, learn instruction message, or the like, may include priority and/or preference information. Such information may be useable, for example, when conflicts and/or racing conditions occur with the DFS, where multiple connection flows might be competing for a single flow cache entry, or the like. In such situations, the DFS might employ the additional information (e.g. priority/presence information) to enable the hottest flows to remain within the DFS's high-speed flow cache. However, the priority/preference information may also be sent for a variety of other reasons, as well, and is not constrained to the non-limiting, non-exhaustive example herein. At block 708, in at least one of the various embodiments, the flow control data associated with the new connection flow may be stored in the DFS high-speed flow cache. In at least one of the various embodiments, flow control data may be stored in one or more components of the DFS that may operate singly or in combination as a high-speed flow cache.

At block 710, in at least one of the various embodiments, the DFS may begin processing received network packets associated with known connection flows using the flow control data that may be associated with the connection flow and stored in the high-speed flow cache.

Figure 8:
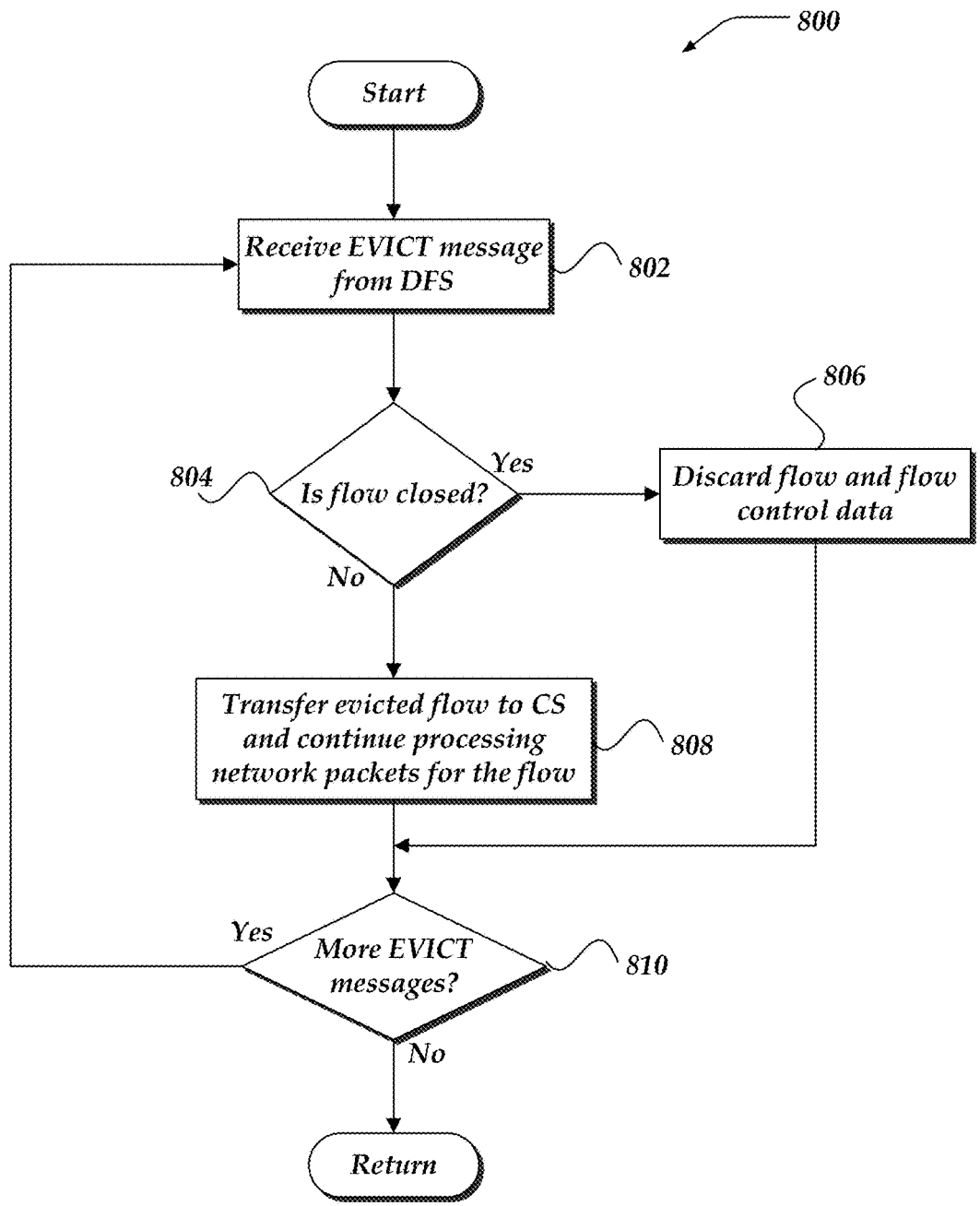
FIG. 8 shows a flowchart of a process for handling eviction messages at a control segment in accordance with at least one of the various embodiments.

FIG. 8 shows a flowchart of process 800, in at least one of the various embodiments, for handling eviction (EVICT) messages at a CS. After a start block, at block 802, the CS may receive an EVICT message from a DFS. In some embodiments, when the high-speed flow cache of the DFS does not exceed its capacity, as detected/predicted by the CS for example, then eviction is not needed. In this embodiment, then all of the connection flows being managed by the DFS might benefit from the high-speed processing, while also avoiding extra control messages/communications between the CS and the DFS.

At decision block 804, in at least one of the various embodiments, if the eviction message corresponds to a closed, idled, and/or terminated connection flow control may move to block 806. Otherwise, in at least one of the various embodiments, control may move to block 808.

At block 806, in at least one of the various embodiments, the closed and/or terminated flow and associated flow control data may be discarded.

At block 808, in at least one of the various embodiments, the responsibility for managing the evicted connection flow may be transferred to the CS. In at least one of the various embodiments, network packets received over the transferred connection flow may be handled by the CS.

In at least one of the various embodiments, the CS may store the flow control data for the evicted connection flow in a local flow cache. In at least one of the various embodiments, the flow cache in the CS may be arranged to include at least the same information that may be stored regarding connection flows using the high speed flow cache on the DFS.

At decision block 810, in at least one of the various embodiments, if there may be more eviction messages to process, control may loop back to block 802. Otherwise, in at least one of the various embodiments, control may be returned to a calling process.

In at least one of the various embodiments, depending on the circumstances, a connection flow may be handled on one or more DFSs, on one or more CSs, or partially on one or more CSs and partially on one or more DFSs. In at least one of the various embodiments, if a connection flow may be being handled by the CS it may not receive a new flow network message from the DFS. Likewise, if a DFS may be handling a connection flow it may not send a new flow network message to the CS component if the DFS can associate the incoming network traffic with a known connection flow. However, in at least one of the various embodiments, the CS may analyze each connection flow to determine the connection flows may be evicted from the DFS.

While the above process discloses that the CS might receive an evict message from the DFS, in other embodiments, the CS can also explicitly send out flow evict messages to the DFS to request that a connection flow be brought back to the CS. The CS might send such messages, for example, when the CS determines that a connection flow is less hot than another connection flow, is no longer hot, to enable continuous handling of the connection flow within the CS, or for a variety of other reasons, including, to allow the DFS resource to be available for other hot connection flows.

Moreover, in the CS might send such evict messages to the DFS in advance, thereby freeing up DFS cache based on predicted requirements, capacity requirements, or the like.

In addition, in some embodiments, priority and/or preference information might be included in an evict message, or even another message, such as a learn instruction message, or the like, from the CS to the DFS. Such priority/preference information might be usable when a conflict and/or racing condition arises within the DFS, such that multiple connect flows are determined to be competing for a single flow cache entry. The priority/preference information may also be sent for reasons, however, in addition to such conflict/racing situations.

In one embodiment, prioritization information might result in keeping an existing connection flow within the DFS and rejecting new flows that cannot be put into due to various reasons, including, resource conflicts such as a table being full, a hash bucket being full, or the like. In some embodiments, the DFS might receive preference information that prefers an existing connection flow over a new connection flow. However, in some embodiments, a new connection flow might take preference over an existing connection flow. Such preferences may be based further on various offloading decisions, metrics, capacity, usage, prioritizations, and/or predictions. Further then, for example, at block 808, for such evicted connection flows that are neither closed nor terminated, the CS may reject an associated client connection request.

Figure 9:
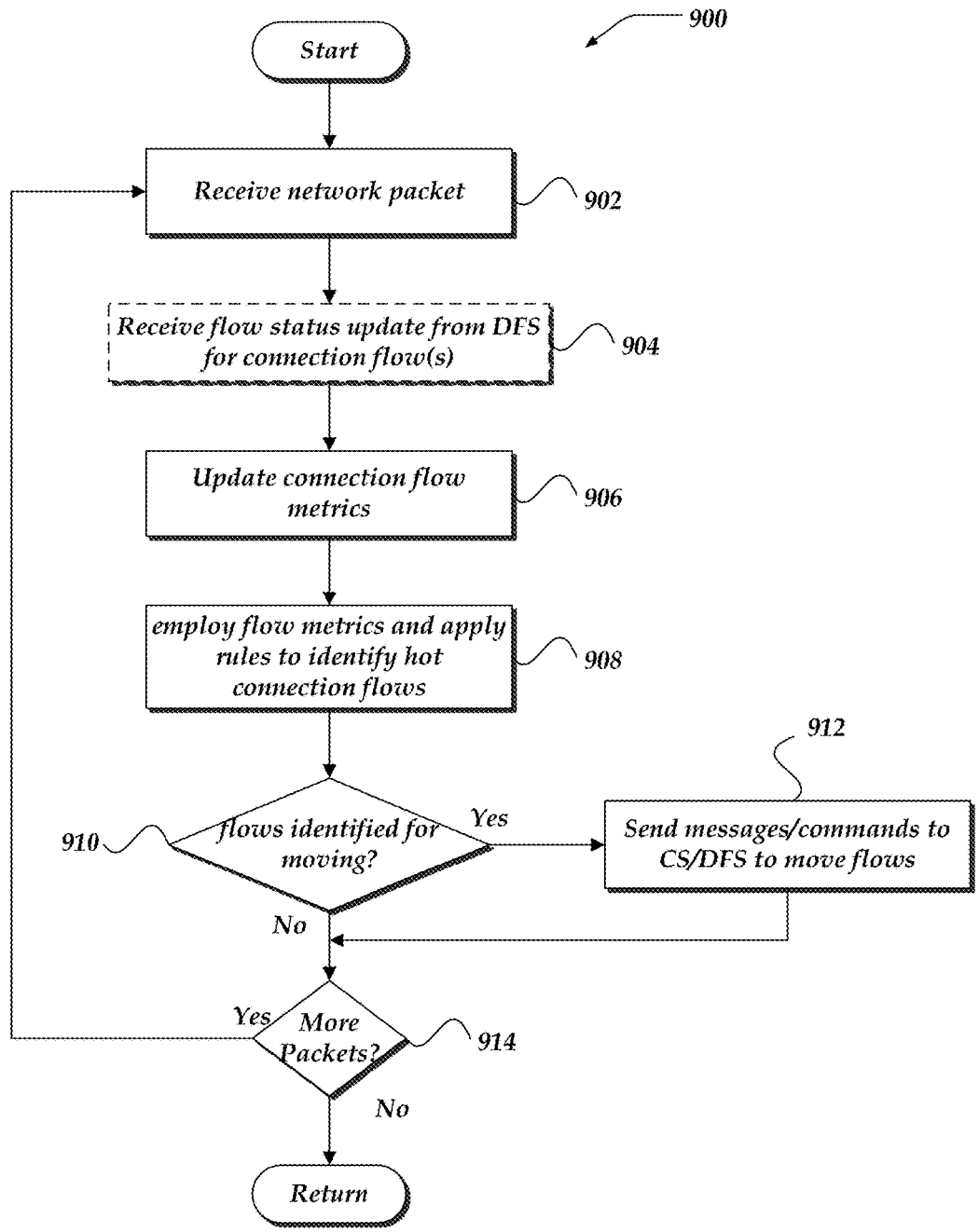
FIG. 9 shows a flowchart of a process for determining if connection flows may be candidates for off-loading to the data flow segment in accordance with at least one of the various embodiments.

FIG. 9 shows a flowchart for process 900 that in at least one of the various embodiments determines if connection flows may be candidates for off-loading to the DFS for handling. After a start block, at block 902, in at least one of the various embodiments, the CS may receive a network packet associated with a connection flow that may be managed by the CS.

In at least one of the various embodiments, network packets received by the CS may be associated connection flows that may have their packet level processing and management processing handled on the CS rather the DFS. In at least one of the various embodiments, as the CS handles the received packets at least in accordance with the stored flow control data it may perform additional action to identify hot connection flows.

At block 904, in at least one of the various embodiments, the CS may receive a flow status update (FSU) from a DFS. In at least one of the various embodiments, the FSU may be received asynchronously with respect to the network packets that may be received by the CS. In at least one of the various embodiments, if a FSU is not available, control may move to block 906.

At block 906, in at least one of the various embodiments, the CS may update the statistics being maintained for the connection flows. In at least one of the various embodiments, statistics may be tracked for the connection flows being managed by the CS directly as well as the connection flows that may be managed by the DFS (e.g., off-loaded connection flows).

In at least one of the various embodiments, the updating of connection flow metrics may use a combination of information from one or more FSUs and metrics that may be collected on the CS, including, bit-rate, data sent over a time interval, data received over a time interval, or the like. In at least one of the various embodiments, the connection flow metrics collected may be based, low level network information derived from L1-L4 as well as higher level network information derived from L5-L7 (as per the Open Systems Interconnection (OSI) model).

At block 908, in at least one of the various embodiments, the CS may analyze the collected connection flow statistics and may apply relevant rules to identify hot connection flows. (See, FIGS. 10-12.) In at least one of the various embodiments, the CS may employ at least one connection flow metric to determine each hot connection flow out of the plurality of managed connection flows. In at least one embodiment, the processes disclosed below in conjunction with FIGS. 10-12 may be employed separately, and/or two or more of the disclosed processes may be combined to identify hot connection flows to be offloaded.

In at least one of the various embodiments, rules may be defined that declare that one or more specific sources, endpoints, data types, or the like may indicated to be hot connection flows. Or, in at least one of the various embodiments, rules may be defined to adjust the priority of certain connection flows based on flow patterns, sources, endpoints, data types, or like.

In at least one of the various embodiments, generally the same type of flow control policies rulemaking may be extended to influence the identification and determination of how connection flows may be designated as hot connection flows.

At decision block 910, if connection flows may be identified for moving from the CS to the DFS and/or from the DFS to the CS for handling, control may move block 912. Otherwise, in at least one of the various embodiments, control may move to decision block 914.

In at least one of the various embodiments, the CS may employ at least one connection flow metric to determine each hot connection flow in the plurality of managed connection flows.

At block 912, in at least one of the various embodiments, if connection flows may be identified for moving, the CS may generate the relevant commands and/or messages to and send to the appropriate CS and/or DFS for handling. In at least one of the various embodiments, some connection flows may be moved from a DFS to the CS for handling. In at least one of the various embodiments, the DFS may be employed to handle each determined hot connection flow.

Also, in at least one of the various embodiments, some of the connection flows that may have been identified as hot connection flows may be moved and/or off-loaded to a DFS for handling to benefit from at least higher performance/processing speeds the may be associated with a DFS. Next, in at least one of the various embodiments, control may move to decision block 914.

At decision block 914, in at least one of the various embodiments, if there may be more network packets available control may loop back to block 902. Otherwise, in at least one of the various embodiments, control may be returned to a calling process.

Figure 10:
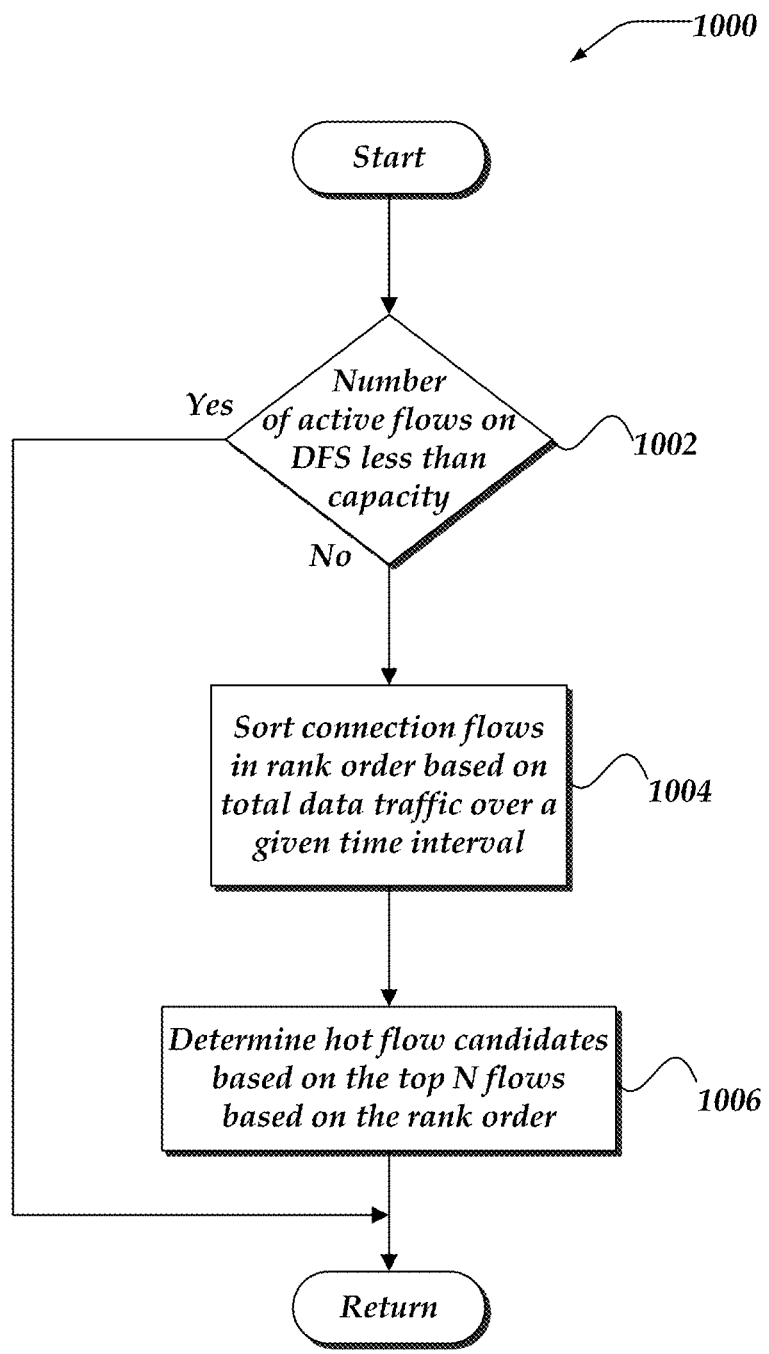
FIGS. 10-12 show flowcharts of processes for identifying hot connection flows in accordance with at least one of the various embodiments.
Figure 11:
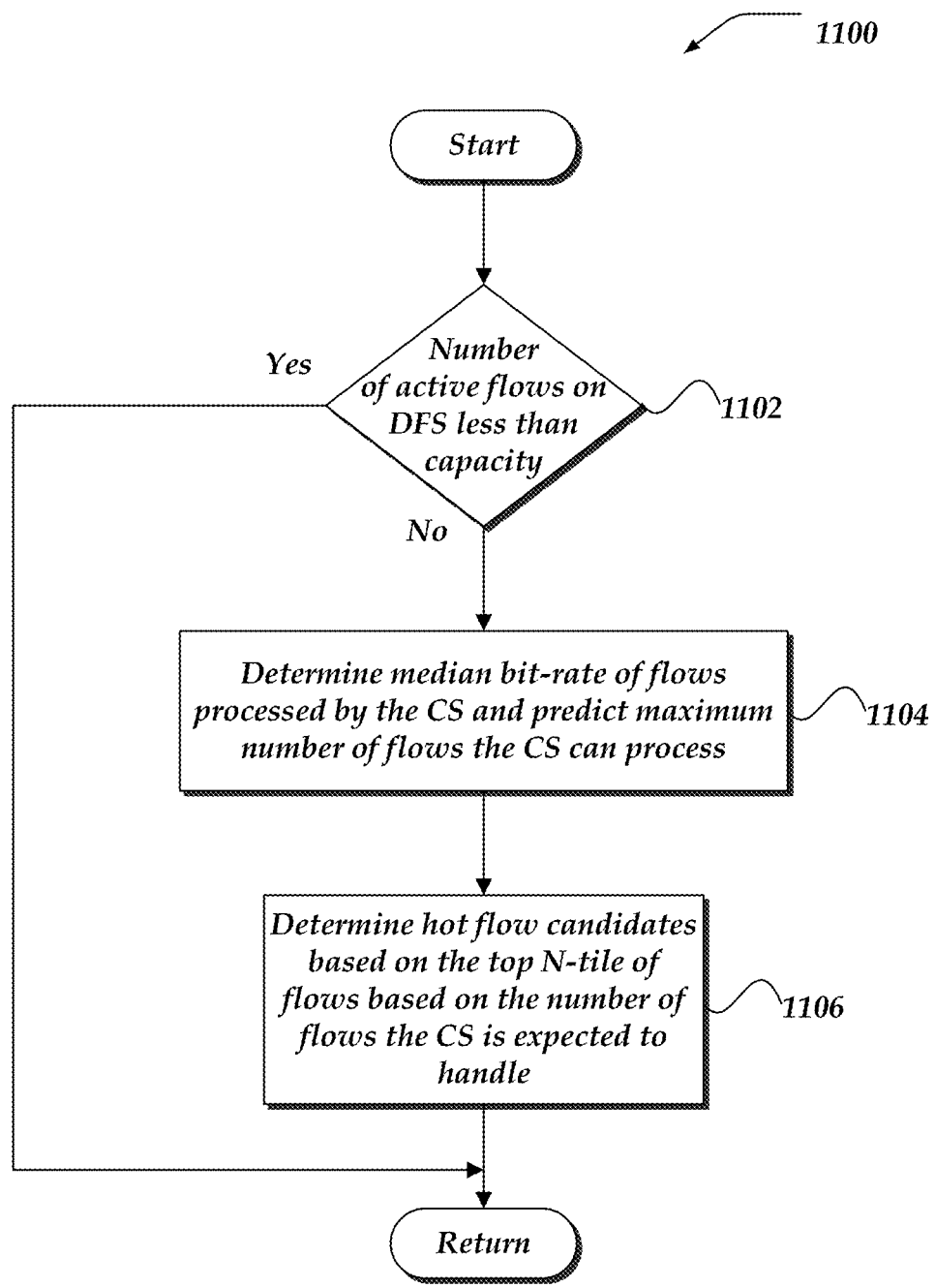
Figure 12:
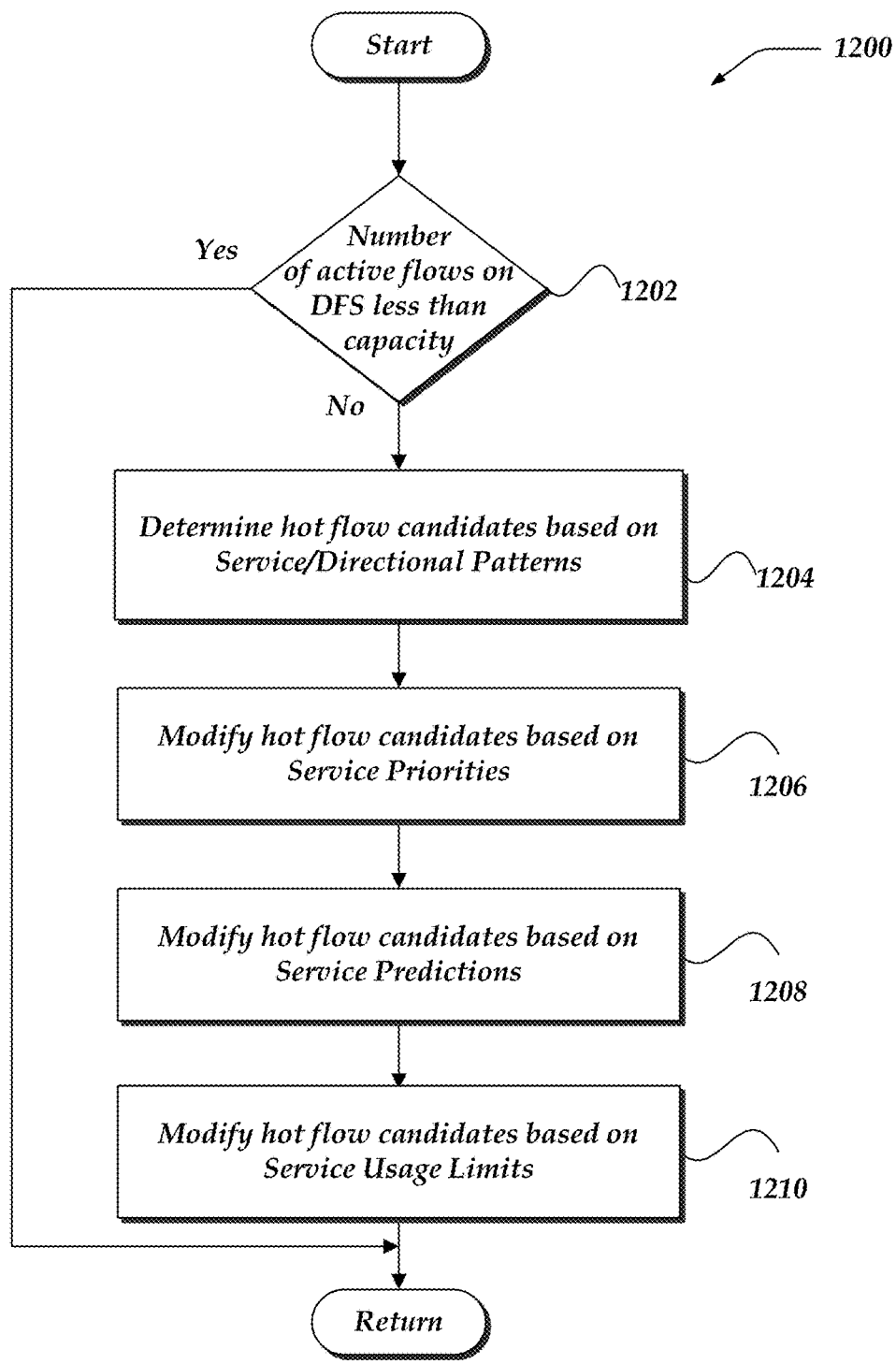

FIGS. 10-12 describe various embodiments for identifying if a connection flow may be a hot connection flow. One of ordinary skill in the art will appreciate that the techniques, parameters, and thresholds used to identify "hot connection flows" may vary depending on the applications being managed by a PTMD and the goals and priorities of the operators and users of the PTMD at a particular time. In at least one of the various embodiments, generally, the criteria for identifying a hot connection flow may be defined based on the application and user goals and if connection flow properties meet the criteria, a connection flow may be deemed a hot connection flow.

In at least one of the various embodiments, as part of determining if a connection flow may be a candidate for offloading to the DFS for handling (e.g., hot connection flow), the content of received network packets may be examined. In at least one of the various embodiments, the network packets may be examined to identify data patterns and meta-data that may indicate that the connection flow may be a hot connection flow that may be a good candidate for offloading to the DFS component.

In at least one of the various embodiments, if examining the network packets, the CS may identify application level protocol data, messages, or meta-data for determining if the associated connection flow may be a hot connection flow. For example, if a CS may identify that a connection flow may be using HTTP; the CS may examine HTTP headers such as, Content-Type, Content-Length, Cache-Control, or the like, as part of determining if a connection flow may be a hot connection flow.

In at least one of the various embodiments, if a network packet may be determined to be a first packet of a HTTP response, a content length value provided by the server sending the HTTP response may be available. In at least one of the various embodiments, the HTTP content length value may indicate the number of network packets that may be likely to be used to transmit the complete HTTP response from the server. For example, in at least one of the various embodiments, if the content length value may indicate that the response may use a single network packet, the associated connection flow may not be a candidate for offloading to the DFS because additional packets may not be expected for this response. On the other hand, in at least one of the various embodiments, if the content length value indicates that more network packets may be on the way for the same response, the connection flow may be determined to be a candidate for offloading to the DFS component. In at least one of the various embodiments, the content length value may correlate to the likelihood of offloading a connection flow to a DFS (e.g., an increase in the content length value leads to an increase in the chance of offloading the connection flow to the DFS).

In at least one of the various embodiments, in some cases, the operating characteristics of a connection flow may have significant variance. For example, in at least one of the various embodiments, the bit-rate for a connection may be prone to spikes if the content/communication may be uneven. Thus, in at least one of the various embodiments, a connection flow once determined to be a good offload candidate (leading to likely offloading to the DFS) may soon be determined to be a poor offload candidate (leading to likely removal from the DFS) depending on the immediate condition and/or characteristics of the underlying communication session.

Further, in at least one of the various embodiments, a type of service associated with a given connection flow, as well as a direction of the flow may be considered in determining whether a connection flow, or part of the flow (one direction versus the other direction) is a candidate hot flow for offloading. In other embodiments, for a given service type, usage limits may be used that limit a number of candidate hot connection flows that may be offloaded. In still other embodiments, a service priority may be used to modify a candidate hot flow determination.

In at least one of the various embodiments, a connection flow may repeatedly cycled back and forth from being handled on the DFS to being handled on CS, or back again. In at least one of the various embodiments, the cycling may occur based on at least the variance of the operating characteristics of the connection flow. In at least one of the various embodiments, this at least enables the performance of the connection flow and the usage of the DFS to be continually optimized to take advantage of the variance in the connection flow operation.

In still other embodiments, based on a characteristic of the service and traffic pattern, a connection flow might be locked to minimize cycling. For example, where a traffic pattern might indicate that a directional flows from a server to a client is predicted to be a candidate for offloading, that directional flow might be offloaded to the hardware and/or locked for a period of time from being evicted from the DFS even though a minimum amount of activity is currently detected for that directional flow. However, the prediction for offloading may be based on a variety of other criteria, including, but not limited to traffic metrics, load usages or the like, for different services at different times/days/months, or the like.

In at least one of the various embodiments, as the network traffic over the connection flow slows, the connection flow may be moved to the CS for handling. Likewise, in at least one of the various embodiments, as the network traffic over the connection flow increases the connection flow may be moved to the DFS for handling.

In at least one of the various embodiments, the cycling of the connection flow between the CS and the DFS components may occur one or more times during a communication session. Also, in at least one of the various embodiments, the cycling operations performed by the CS and the DFS components may be seamless and unseen/opaque to both ends of the communication session. FIG. 10 shows a flowchart for at least one of the various embodiments of process 1000 for identifying hot connection flows. After a start block, at decision block 1002, in at least one of the various embodiments, if the number of connection flows being handled on the PTMD may less than the capacity of the DFS control may be returned to the calling process. That is, when it is determined that the DFS control is potentially being underutilized, then, in one embodiment, virtually all of the available connection flows may be eligible to be moved to the DFS control, at least until the capacity is reached. Thus, when the capacity is reached, in at least one of the various embodiments, control may move to block 1004. In at least one of the various embodiments, if the high speed flow cache on the DFS has unused capacity both hot connection flows and "normal" connection flows may be processed on the DFS.

At block 1004, in at least one of the various embodiments, connection flows may be sorted in rank order based on the amount of data traffic passed through, exchanged, or communicated through the connection flow in a given time interval.

In at least one of the various embodiments, well known data structures and sorting algorithms may be employed to generate a tabular data structure wherein the connection flows may be logically order from based on amount of the data traffic passing through the connection flow over a time interval.

At block 1006, in at least one of the various embodiments, hot flow candidates may be determined and identified based on the top N flows based on the rank order.

In at least one of the various embodiments, the rules associated with determining/defining hot connection flows may include parameters such as "N" (e.g., how many of the top connection flows may be designated as hot connection flows). In at least one of the various embodiments, "N" may be based on a formula that may include additional parameters including having different values based on the type of connection flow.

Next, control may be returned to a calling process.

FIG. 11 shows a flowchart for at least one of the various embodiments of process 1100 for identifying hot connection flows. After a start block, at decision block 1102, in at least one of the various embodiments, if the number of connection flows being handled on the PTMD may be less than the capacity of the DFS, control may be returned to the calling process. Otherwise, in at least one of the various embodiments, control may move to block 1104. In at least one of the various embodiments, if the high speed flow cache on the DFS has unused capacity both hot connection flows and "normal" connection flows may be processed on the DFS.

At block 1104, in at least one of the various embodiments, the median bit-rate of connection flows being handled on the CS may be determined for use in predicting a maximum number of connection flows that may be processed by the CS. For example, in at least one of the various embodiments, if the median bit-rate of connection flows currently being handled on the CS may be 1 million bits per second and the total bandwidth of the CS for handling connection flows may be 2000 million bits per second, the maximum number of connection flows that may be processed may be estimated as 2000 connection flows (2000 million bits/sec/1 million bits/sec).

At block 1106, in at least one of the various embodiments, hot connection flow candidates may be identified based on the top N-tile of connection flows based on the maximum number of flows the CS may be expected to handle. For example, in at least one of the various embodiments, if a CS may be expected to handle 2000 connection flows, the top 25% of connection flows based on bit-rate (for a count of 500 flows) may identified as hot connection flows. Next, in at least one of the various embodiments, control may be returned to a calling process.

FIG. 12 shows a flowchart for at least one of the various embodiments of process 1200 for identifying hot connection flows based on characteristics of a service associated with a connection flow. Process 1200 begins, after a start block, at decision block 1202, where in at least one of the various embodiments, if the number of connection flows being handled on the PTMD are less than the capacity of the DFS, control may be returned to the calling process. Otherwise, in at least one of the various embodiments, control may move to block 1204.

At block 1204, candidate hot flows are determined based on service directional patterns. That is, connection flow metrics obtained in process 900 of FIG. 9 may be used to determine characteristics of the real time traffic and current load on the system. These characteristics include direction patterns and service patterns, where direction patterns provide information about a traffic distribution between server-bound and client-bound traffic within a same service type. A service pattern may provide information about a traffic distribution among different services managed by the system.

These patterns may then be used to differentiate services and service directions. Based on the patterns, as well as other information, services may then be prioritized and assigned a real time service priority. In some embodiments, a configurable direction-bound ratio threshold may be employed for tuning offload decisions for flows within a same service in case of dramatic traffic imbalances between server-bound and client-bound flows. Thus, offloads for a connection flow may be made specific to a direction of the flow—server-bound direction or client-bound direction. In some embodiments for example, one direction of the connection flow might be designated as a hot flow candidate for offloading to the DFS, while the opposite direction of the same connection flow might be managed by the CS and not designated for offloading.

Thus, at block 1204 the connection flows currently being managed by the system may be categorized into different services, such as a messaging service, a web HTML service, an FTP service, or any of a variety of other possible service categorizations. Further, within each service activities may be further categorized as server-bound traffic or client-bound traffic for directional flows.

In some embodiments, traffic patterns within each service may be analyzed in the aggregate and a determination of whether to designate the traffic as a hot flow candidate may be done by each direction within each service.

As a non-limiting example, consider services A and B, where for service A, 90% of its traffic is categorized as server-bound traffic, while 10% is client-bound traffic. Assume for service B, 60% of its traffic is server-bound traffic, while 40% of its traffic is client-bound traffic. Further, assume a configurable direction-bound ratio threshold is set to 70%. It should be recognized that the direction-bound ratio threshold may be set and tuned based on a variety of criteria. For example, feedback about changes in the offload patterns, loading, or the like, may be used to modify or otherwise tune the direction-bound ratio threshold. Thus, it should be understood that other values may also be used. Moreover, each service might apply a different value for its direction-bound ratio threshold. However, for simplicity, assume for this example that each service employs the same 70% value.

In any event, in the above example, because the server-bound traffic for service A exceeds the direction-bound ratio threshold, the CS would designate as candidate hot flows for offloading to the DFS the server-bound traffic for service A, in the aggregate. When each server-bound network packet is received for a given connection flow within service A, the server-bound directional portion of the connection may be offloaded. In some embodiments, offloading service A connection flows might be performed at a per connection flow when network packets are received for that connection flow. For example, if service A includes connection flows 1, 2, and 3, which in the aggregate are designated to be offloaded, each connection flow would not be offloaded until a network packet is received for that connection.

In the example, neither of the directional flows for service B is determined to exceed the direction-bound ratio threshold. Thus, in some embodiments, the CS would not designate any of the connection flows in service B as candidate hot flow connections to be offloaded. However, in one embodiment, where a connection flow within service B might already be designated for offload based on any of a variety of other reasons, that connection flow might not be evicted. In other embodiments, however, where the server-bound traffic for service B is already offloaded and the client-bound traffic is not offloaded, the CS might elect to have the client-bound traffic also offloaded.

Moving next to block 1206, the candidate hot flow connections designated for offloading at block 1204 may be modified based on a service priority. In some embodiments, a user-configurable service priority and a real time priority may be obtained and used to modify candidate offload flows. A relative weighting may then be determined using the user-configurable priority over the real time (runtime) priority. This ratio may then be compared to a configurable priority ratio.

For example, assuming there are 1000 services, each service may be assigned a user-configurable service priority between 1-1000, which indicates a priority for offloading a given service flow into the DFS. Other values may also be selected. Then, for services A and B and knowledge obtained from cost (such as a processing resource consumption cost, or the like), user-preferences, loads, and/or other characteristics, service A might be designated a user-configurable service priority of 100, while service B might be designated a user-configurable service priority of 200. These example priorities may indicate a preference to offload service A to the DFS is higher than service B, where a lower value indicates a higher priority, in this example. Clearly, other evaluations may be performed, including, for example, a higher value might indicate a higher priority, or the like.

As real time traffic patterns and flow metrics are collected, in this example, the metrics might indicate that there are far more service B's traffic data than service A's traffic. Therefore, real time priorities might be assigned for the services. For example, assume that service B is given a real time priority 10, while service A is given a real time priority of 1000. Then, given these example values, a system ratio of 10:1 (real time vs. user configurable priority) might be determined as:

Service A priority=(100*1+1000*10)/11

Service B priority=(200*1+1*10)/11

The above non-limiting example would then indicate that service B would be given a higher preference for offloading to the DFS over service A. Using the above algorithm, hot flow candidates designated for offloading at block 1204 may be modified based on service priorities.

Moving next to block 1208, patterns within a service may be further analyzed to predict candidate flows for offloading. As discussed in conjunction with FIG. 13 below, certain types of actions in one direction of traffic for a service might result in a predictable significant amount of traffic in response in the other direction. For example, it might be predicted that when a server-bound network packet is associated with a request for content, there will be significant (above some threshold value) of traffic in the client-bound direction. Using this analysis of traffic patterns for a service, predictions may be made that may then be used to designate a connection flow for offloading.

However, predictions for candidate flows for offloading is not constrained to the above, and other criteria may be used, including, for example, predictions based on traffic metrics, load usages, or the like, for different services at different times, or the like. Similarly, predictions (or hints) may also be provided for real time service prioritization. For example, given that service A might have high volume in the morning, while service B has a higher volume over A in the afternoon, then each might have an adaptive real time priority change at runtime, evening time, of the like. Similarly, one service might have more streamlining video services over another service. Detection of such activities may then be used to make predictions that can modify a service priority and/or otherwise modify candidate flows for offloading. It is noted that these examples are not limiting or exhaustive and therefore to be construed as limiting the scope of the various embodiments herein.

The results of block 1208 may then further modify the hot flow candidates from block 1206 and/or block 1204.

Process 1200 flows next to block 1210, where the candidate connection flows for offloading to the hardware acceleration may be further modified based on a service resource usage limit. In some embodiments, it might be desirable to restrict the amount of traffic for a given service that is offloaded to the DFS. Therefore, in some embodiments, one or more of the services may be assigned a service resource usage limit. Then, network connection flows for that service may be designated for offloading up to but not exceeding the assigned service resource usage limit. For example, it might be determined that no more than 20% of the network connections for service A may be offloaded. In another embodiment, the service resource usage limit might indicate an amount of capacity of the DFS that is allowed to be used by service A. For example, no more than 20% of the capacity of the DFS might be used by service A. Other limit values may also be used. In any event, at block 1210, the candidate connection flows may be further modified based on the service resource usage limit. Process 1200 may be returned to a calling process, such as process 900 of FIG. 9.

It will be understood that figures, and combinations of actions in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational actions to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Example Offload Predictions by Service

Figure 13:
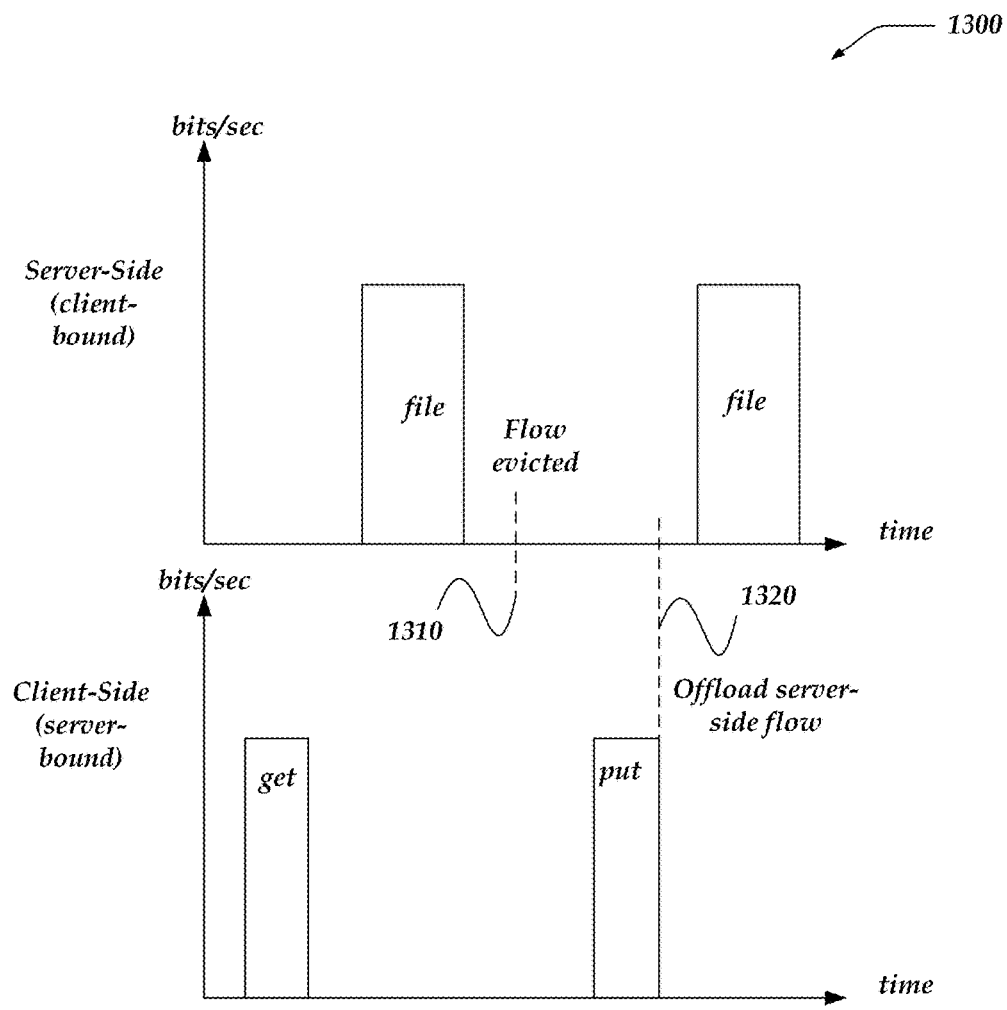
FIG. 13 illustrates one non-exhaustive, non-limiting example of predictive offloading of a service directional flow.

FIG. 13 illustrates one non-exhaustive, non-limiting example of predictive offloading of a service directional flow. Example 1300 of FIG. 13 illustrates a traffic pattern for the HTML service. Shown are a client-bound traffic pattern and a server-bound traffic pattern for a connection flow. Analysis of the patterns may indicate that after particular types of activity on the server-bound direction, it might be predicted that traffic will occur in the client-bound direction. In some embodiments, it might occur that based on some level of inactivity for a period of time, a connection might be evicted from the DFS. For example, at time 1310, it might be determined that no activity is detected in the client-bound direction for this connection flow. Therefore, at time 1310, the client-bound connection flow would be evicted. However, at some time in the future, based on particular actions detected in the server-bound traffic, more traffic is detected in the client-bound direction that could result in designating the client-bound connection flow for offloading. A possible outcome is that the client-bound traffic could be bounced back and forth between the CS and the DFS. However, by analyzing the pattern for a given service, a connection flow could be locked or otherwise tagged to remain for a longer time period in the DFS. In other embodiments, the flow might be evicted, but, when a particular action is detected in the server-bound direction, the client-bound direction of the connection flow could be designated for offloading before activity is detected in the client-bound direction. Thus, at time 1320, in one embodiment, the client-bound direction might be designated for offloading in anticipation of increased client-bound traffic. It should be noted that while this example illustrated actions taken based on analysis of activity in server-bound traffic, actions might also be taken based on analysis of the client-bound traffic, and/or a combination of server and client bound traffic patterns.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing communication over a network with a traffic management device (TMD) that includes a plurality of components that employ one or more processors to perform actions, comprising:
   employing one or more control segment (CS) components to perform actions, including:
      determining one or more directional-bound patterns and one or more service patterns for received network packets, wherein the one or more directional-bound patterns and the one or more service patterns are employed to identify one or more hot connection flows that are handled by one or more data flow segment (DFS) components at the network packet level; and
      employing the directional bound patterns and service patterns to determine when one or more hot connection flows allocated for handling by the one or more DFS components is instead handled by the one or more CS components.

2. The method of claim 1, wherein the one or more DFS components handle one or more of a plurality of connections flows, and wherein the one or more CS components manage the plurality of connection flows and handle a remainder portion of the plurality of connection flows that is non-handled by the one or more DFS components.

3. The method of claim 1, further comprising generating the one or more directional-bound patterns that indicate one or more directional traffic distributions within one or more service types based on one or more received network packets for one or more of a plurality of connection flows.

4. The method of claim 1, further comprising generating the one or more service patterns that indicate a traffic distribution among a plurality of services based on one or more received network packets for one or more of a plurality of connection flows.

5. The method of claim 1, further comprising modifying the one or more hot connection flows based on one or more of a service priority, a service resource usage limit, or a prediction of the one or more service resource patterns.

6. The method of claim 1, further comprising employing one or more of a metric or a rule to either move a hot connection flow from the one or more DFS components to the one or more CS components or move the hot connection flow from the one or more CS components to the one or more DFS components.

7. The method of claim 1, further comprising when a capacity of a DFS component is reached, performing actions, including:
   ranking each connection flow for a predetermined period of time based on an amount of network packets that are handled by the DFS component; and
   identifying the one or more hot connection flows based on the ranking.

8. A network device, comprising:
   a memory that is operative to store instructions; and
   one or more processors that is operative to execute instructions that perform actions, including:
      employing one or more control segment (CS) components to perform actions, including:
         determining one or more directional-bound patterns and one or more service patterns for received network packets, wherein the one or more directional-bound patterns and the one or more service patterns are employed to identify one or more hot connection flows that are handled by one or more data flow segment (DFS) components at the network packet level; and
         employing the directional bound patterns and service patterns to determine when one or more hot connection flows allocated for handling by the one or more DFS components is instead handled by the one or more CS components.

9. The network device of claim 8, wherein the one or more DFS components handle one or more of a plurality of connections flows, and wherein the one or more CS components manage the plurality of connection flows and handle a remainder portion of the plurality of connection flows that is non-handled by the one or more DFS components.

10. The network device of claim 8, further comprising generating the one or more directional-bound patterns that indicate one or more directional traffic distributions within one or more service types based on one or more received network packets for one or more of a plurality of connection flows.

11. The network device of claim 8, further comprising generating the one or more service patterns that indicate a traffic distribution among a plurality of services based on one or more received network packets for one or more of a plurality of connection flows.

12. The network device of claim 8, further comprising modifying the one or more hot connection flows based on one or more of a service priority, a service resource usage limit, or a prediction of the one or more service resource patterns.

13. The network device of claim 8, further comprising employing one or more of a metric or a rule to either move a hot connection flow from the one or more DFS components to the one or more CS components or move the hot connection flow from the one or more CS components to the one or more DFS components.

14. The network device of claim 8, further comprising when a capacity of a DFS component is reached, performing actions, including:
  ranking each connection flow for a predetermined period of time based on an amount of network packets that are handled by the DFS component; and
  identifying the one or more hot connection flows based on the ranking.

15. A non-transitory computer readable medium, having computer-executable instructions stored thereon, that in response to execution by one or more processors, causes a network device to perform operations, comprising:
  employing one or more control segment (CS) components to perform actions, including:
    determining one or more directional-bound patterns and one or more service patterns for received network packets, wherein the one or more directional-bound patterns and the one or more service patterns are employed to identify one or more hot connection flows that are handled by one or more data flow segment (DFS) components at the network packet level; and
    employing the directional bound patterns and service patterns to determine when one or more hot connection flows allocated for handling by the one or more DFS components is instead handled by the one or more CS components.

16. The medium of claim 15, further comprising modifying the one or more hot connection flows based on one or more of a service priority, a service resource usage limit, or a prediction of the one or more service resource patterns.

17. The medium of claim 15, further comprising employing one or more of a metric or a rule to either move a hot connection flow from the one or more DFS components to the one or more CS components or move the hot connection flow from the one or more CS components to the one or more DFS components.

18. The medium of claim 15, further comprising when a capacity of a DFS component is reached, performing actions, including:
  ranking each connection flow for a predetermined period of time based on an amount of network packets that are handled by the DFS component; and
  identifying the one or more hot connection flows based on the ranking.

19. The medium of claim 15, further comprising generating the one or more directional-bound patterns that indicate one or more directional traffic distributions within one or more service types based on one or more received network packets for one or more of a plurality of connection flows.

20. The medium of claim 15, further comprising generating the one or more service patterns that indicate a traffic distribution among a plurality of services based on one or more received network packets for one or more of a plurality of connection flows.

* * * * *